(12) United States Patent
Clark

(10) Patent No.: US 11,631,339 B2
(45) Date of Patent: Apr. 18, 2023

(54) TRAINING SIMULATION SYSTEM AND METHOD FOR DETECTION OF HAZARDOUS MATERIALS

(71) Applicant: Stephen Clark, Hamilton (CA)

(72) Inventor: Stephen Clark, Hamilton (CA)

(*) Notice: Subject to any disclaimer, the term of this patent is extended or adjusted under 35 U.S.C. 154(b) by 70 days.

(21) Appl. No.: 17/112,695

(22) Filed: Dec. 4, 2020

(65) Prior Publication Data

US 2021/0174695 A1     Jun. 10, 2021

Related U.S. Application Data

(60) Provisional application No. 62/944,539, filed on Dec. 6, 2019.

(51) Int. Cl.
| | | |
|---|---|---|
| *G09B 9/00* | (2006.01) | |
| *G01N 1/22* | (2006.01) | |
| *G09B 19/24* | (2006.01) | |
| *G05D 1/00* | (2006.01) | |

(52) U.S. Cl.
CPC .......... *G09B 9/006* (2013.01); *G01N 1/2273* (2013.01); *G05D 1/0061* (2013.01); *G09B 19/24* (2013.01)

(58) Field of Classification Search
CPC .......... G09B 9/00; G09B 9/006; G09B 19/24; G01N 1/2273; G05D 1/00; G05D 1/0061
See application file for complete search history.

(56) References Cited

U.S. PATENT DOCUMENTS

| | | |
|---|---|---|
| 9,165,475 B2 | 10/2015 | Ambrose |
| 9,230,450 B1 | 1/2016 | Bergeron |
| 2004/0033472 A1* | 2/2004 | Varshneya ............ F41G 3/2688 434/23 |
| 2009/0263770 A1 | 10/2009 | Ambrose |
| 2012/0183940 A1* | 7/2012 | Aragones ............... A61B 5/744 434/247 |

* cited by examiner

*Primary Examiner* — Timothy A Musselman
(74) *Attorney, Agent, or Firm* — Vincent G. LoTempio

(57) ABSTRACT

A training simulation system and method for detection of hazardous materials simulates real-world hazardous environments to provide a trainee with hazardous material training. The system provides a hazardous material detection simulator that displays simulated readings to indicate presence thereof. The detection simulator automatically generates the simulated readings, based on its relative position to the hazard point, and based on preprogrammed hazard points in the area. A host trainer, through a trainer communication device, remotely generates and adjusts the simulated readings while tracking vehicle's position. A vehicle integrally contains the hazardous material detection simulator. A trainee controls the vehicle while also observing and reacting to the simulated readings. Once the hazard point is determined, based on simulated readings, the trainee can form a decision on the readings and react accordingly. The simulated readings can be adjusted based on the reaction of the trainee and position of vehicle relative to hazard point.

19 Claims, 17 Drawing Sheets

1400

1402

1404
USER NAME

USER ENTERS NAME HERE

EXAMPLE NAME

1406
SESSION NAME

DROPDOWN MENU FOR USERS TO SEE AVAILABLE SESSIONS

1408 LOG ON

1410

CLICK TO HOST SESSION

CLICK TO JOIN SESSION

CLICK TO SPECTATE SESSION

WEBSITE

FIG. 14

TRAINING SIMULATION SYSTEM AND METHOD FOR DETECTION OF HAZARDOUS MATERIALS

CROSS REFERENCE OF RELATED APPLICATIONS

This application claims the benefits of U.S. provisional application No. 62/944,539, filed Dec. 6, 2019 and entitled HAZARDOUS MATERIALS DETECTOR TRAINING SYSTEM AND METHOD, which provisional application is incorporated by reference herein in its entirety.

FIELD OF THE INVENTION

The present invention relates generally to a training simulation system and method for detection of hazardous materials. More so, the present invention relates to a training simulation system for simulating real-world hazardous environments, where a vehicle, including an aerial vehicle, drone, underwater vehicle, or land vehicle, carries a hazardous material detection simulator over an area, or has software directly integrated into the vehicle, and flight controller and/or ground station; a host trainer generates and transmits simulated readings to the hazardous material detection simulator while the device navigates over the area, so as to create a hazard point; and a trainee observes the simulated readings from the hazardous material detection simulator to form decisions on the readings.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, handheld hazardous materials detection instruments are used for detecting hazards in a wide variety of potentially hazardous environments. Proper use of the signals provided by these hazmat devices received on detectors is critical to locating and managing a contaminated area effectively. Proper operator training is necessary to achieve this result, however, training in real world situations can be dangerous and difficult, and training using genuine hazardous materials can be expensive and dangerous as well. Proper training, prior to exposure to hazardous materials is necessary for trainee and first responder safety.

In general, hazardous material detectors cannot be used for training, because a training mode could be confused with an actual hazardous material mode during use. Designing and manufacturing new devices exclusively for training use only would be prohibitively expensive. Therefore, there is a need for converting or using an existing device or devices for training, without causing user confusion. With the advent of unmanned, or unscrewed, aerial vehicles (UAVs), Drones (land, air, and sea), and there use in hazardous material environments, training first responders with these devices, in conjunction with conventional hazardous material response, is important for current situations.

Other proposals have involved training systems for first responders of hazardous materials. The problem with these hazardous material training systems is that they require the use of real hazardous materials, which can be dangerous and expensive. Also, a training mode could be confused with an actual hazardous material mode during use. Even though the above cited hazardous material training systems meet some of the needs of the market, a training simulation system and method for detection of hazardous materials for simulating real-world hazardous environments, where a vehicle, including an aerial vehicle, drone, underwater vehicle, or land vehicle, carries a hazardous material detection simulator over an area, or has software directly integrated into the vehicle, and flight controller and/or ground station; a host trainer generates and transmits simulated readings to the hazardous material detection simulator while the device navigates over the area, so as to create a hazard point; and a trainee observes the simulated readings from the hazardous material detection simulator to form decisions on the readings is still desired.

SUMMARY

Illustrative embodiments of the disclosure are generally directed to a training simulation system and method for detection of hazardous materials. The training simulation system is used for simulating real-world hazardous environments so that a host trainer can control hazardous material conditions and environments to provide a trainee with realistic hazardous material training. The training simulation system can be especially useful for training proper identification and responses to hazardous materials related to chemical, biological, radiological, nuclear, and high yield explosives (CBRNE).

In some embodiments, the training simulation system provides a hazardous material detection simulator that displays one or more simulated readings. The training simulation device is configured to simulate readings known in the art of hazardous materials, so as to indicate presence thereof. The detection of simulated readings may be an indication of the presence, intensity, and quantity of a hazardous material at or near a hazard point in an area.

In other embodiments, the hazardous material detection simulator automatically generates the simulated readings, based on its relative position to the hazard point, and based on preprogrammed hazard points in the area. However, in other embodiments, a host trainer, through use of a trainer communication device, can remotely generate and adjust the simulated readings while tracking its position.

In yet other embodiments, the training simulation system provides a vehicle that integrally contains the hazardous material detection simulator. A trainee may navigate the vehicle in an area. In one embodiment, the vehicle is an unmanned aerial vehicle or a drone. However, in other embodiments, the vehicle can include: an underwater vehicle, a submarine, a car, a truck, an off-road vehicle, a dog robot, and a general robot.

In yet other embodiments, the training simulation system enables a host trainer to generate simulated readings through the trainer communication device. The host trainer can adjust the simulated readings to simulate different locations, intensities, and quantities of hazardous materials. The simulated readings are generated while the hazardous material detection simulator navigates over an area. This dynamic combination of real time generation of simulated readings, while the hazardous material detection simulator navigates over an area, creates the hazard point.

In some embodiments, the training simulation system also enables a trainee to control the vehicle while also observing the simulated readings generated on the hazardous material detection simulator. The trainee accesses the simulated readings through a trainee communication device that is in communication with the hazardous material detection simulator, through a network. Once the hazard point is determined, based on the simulated readings, the trainee can form a decision on the readings, receive advice from the host trainer, and request assistance form the host trainer. This interactive, real-time observation of simulated readings serves as a unique training regimen.

In one aspect, the hazardous material detection simulator can be programmed to automatically simulate the hazardous material readings while navigating the vehicle, aerial vehicle, drone, underwater vehicle, or land vehicle; and approaching a predetermined map point, or GPS area.

In another aspect, the host trainer utilizes a host mobile device to control the simulated readings on the hazardous material detection simulator on the aerial vehicle.

In another aspect, the simulated readings are observed on a trainer communication device, and a trainee communication device that are connected to a training session through a network. The simulated readings and images of the area by the vehicle are mirrored onto a screen for incident commanders, spectators, or other trainees to observe and form decisions on the data.

In another aspect, a pilot controls the aerial vehicle.

In another aspect, a network shares the simulated readings, making the readings accessible to the host trainer, the trainee, and the pilot.

In another aspect, the aerial vehicle can be tracked in real time on GPS on the hazardous material detection simulator, and tracked by the host trainer, the trainee, the pilot, and spectators.

In one embodiment, a training simulation method for detection of hazardous materials includes an initial Step of providing a hazardous material detection simulator, the hazardous material detection simulator being operable to display one or more simulated readings.

The method may further comprise a Step of generating the simulated readings.

The method may further comprise a Step of integrating the hazardous material detection simulator into a vehicle.

A Step includes navigating an area with the vehicle.

In some embodiments, a Step comprises capturing an image indicative of the position of the vehicle in relation to the area.

A Step includes observing the simulated readings in relation to the hazard point.

In some embodiments, a Step may include reacting to the hazard point.

A final Step includes adjusting the simulated readings, based on the reaction.

In another aspect, the method further comprises, automatically generating, with the hazardous material detection simulator, the simulated readings.

In another aspect, the method further comprises, automatically adjusting, with the hazardous material detection simulator, the simulated readings, depending on the reaction and the proximity of the vehicle to the hazard point.

In another aspect, the method further comprises, generating, by a host trainer, with a trainer communication device, the simulated readings.

In another aspect, the method further comprises, adjusting, by the host trainer, with the trainer communication device, the simulated readings, depending on the reaction and the proximity of the vehicle to the hazard point.

In another aspect, the trainer communication device comprises at least one switch operable to enable incrementally adjusting the simulated readings.

In another aspect, the method further comprises, transmitting, through telemetry, the image indicative of the position of the vehicle to the trainer communication device.

In another aspect, the method further comprises, observing, by a trainee, with a trainee communication device, the simulated readings in relation to the hazard point.

In another aspect, the method further comprises, reacting to the hazard point, by the trainee, to identify the hazard point.

In another aspect, the method further comprises, connecting the hazardous material detection simulator and the trainer communication device to a network.

In another aspect, the method further comprises, sharing the simulated readings on the network.

In another aspect, the method further comprises, tracking the position of the vehicle with a global positioning system.

In another aspect, the method further comprises, automatically adjusting, with the hazardous material detection simulator, the simulated readings, depending on the tracked position of the vehicle.

In another aspect, the hazardous material detection simulator includes at least one of the following: a smart phone, a tablet, a laptop, a digital display, a processor, and an algorithm.

In another aspect, the vehicle includes at least one of the following: an unmanned aerial vehicle, a drone, an underwater vehicle, a submarine, a car, a truck, an off-road vehicle, a dog robot, and a general robot.

In another aspect, the simulated readings include at least one of the following units: parts per million, parts per billion percentage, percentage volume, sievert, unit rem, and roentgen.

One objective of the present invention is to enable more cost-effective and realistic training, and improve the response to actual hazardous material incidents by first responders.

Another objective is to provide training, prior to exposure to hazardous materials for trainee and first responder safety.

Yet another objective is to allows a host trainer to simulate hazards and communicate the simulations to a trainee through a trainee mobile device.

An exemplary objective is to track the vehicle, aerial vehicle, drone, underwater vehicle, or land vehicle in real time on a global position system (GPS) on a portable communication device for the host trainer and the trainee, as well as for the spectators on a TV, such that the participants can be in communication via radio, the application, or other methods.

Additional objectives are to provide an easy to operate system and method training simulation system and method for detection of hazardous materials.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 14 illustrates a trainee communication device displaying a login screen, in accordance with an embodiment of the present invention;

FIG. 15A shows an unmanned aerial vehicle carrying a hazardous material detection simulator on top surface in an upright position, for capturing images, FIG. 15B shows unmanned aerial vehicle carrying hazardous material detection simulator on bottom surface, and FIG. 15C shows unmanned aerial vehicle carrying hazardous material detection simulator on top surface in horizontal orientation, and further, although the unmanned aerial vehicle, or other type of vehicle, may carry the simulator, software may be directly integrated into the drone and flight controller and/or ground station, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A training simulation system 100 and method 1700 for detection of hazardous materials is referenced in FIGS. 1-17. Training simulation system 100, hereafter "system 100", is configured to provide realistic hazardous materials training through simulations of one or more simulated readings 104, which indicate the presence of hazardous materials in an area 108. Simulated readings 104 are configured to accurately simulate eclectic detectors and devices operational in real-life hazardous material scenarios, imitating the real world in terms of appearance and signals. The use of simulated readings 104 is effective for providing a trainee 116 with realistic hazardous material training, while negating the need to use real hazardous materials. System 100 is configured to display any number of single or simultaneous simulated hazards, and can be modified to represent any hazard for which a hazardous materials detection device is made to identify. In this manner, system 100 is efficacious for training proper identification and responses to hazardous materials related to chemical, biological, radiological, nuclear, and high yield explosives (CBRNE).

Figure 1:
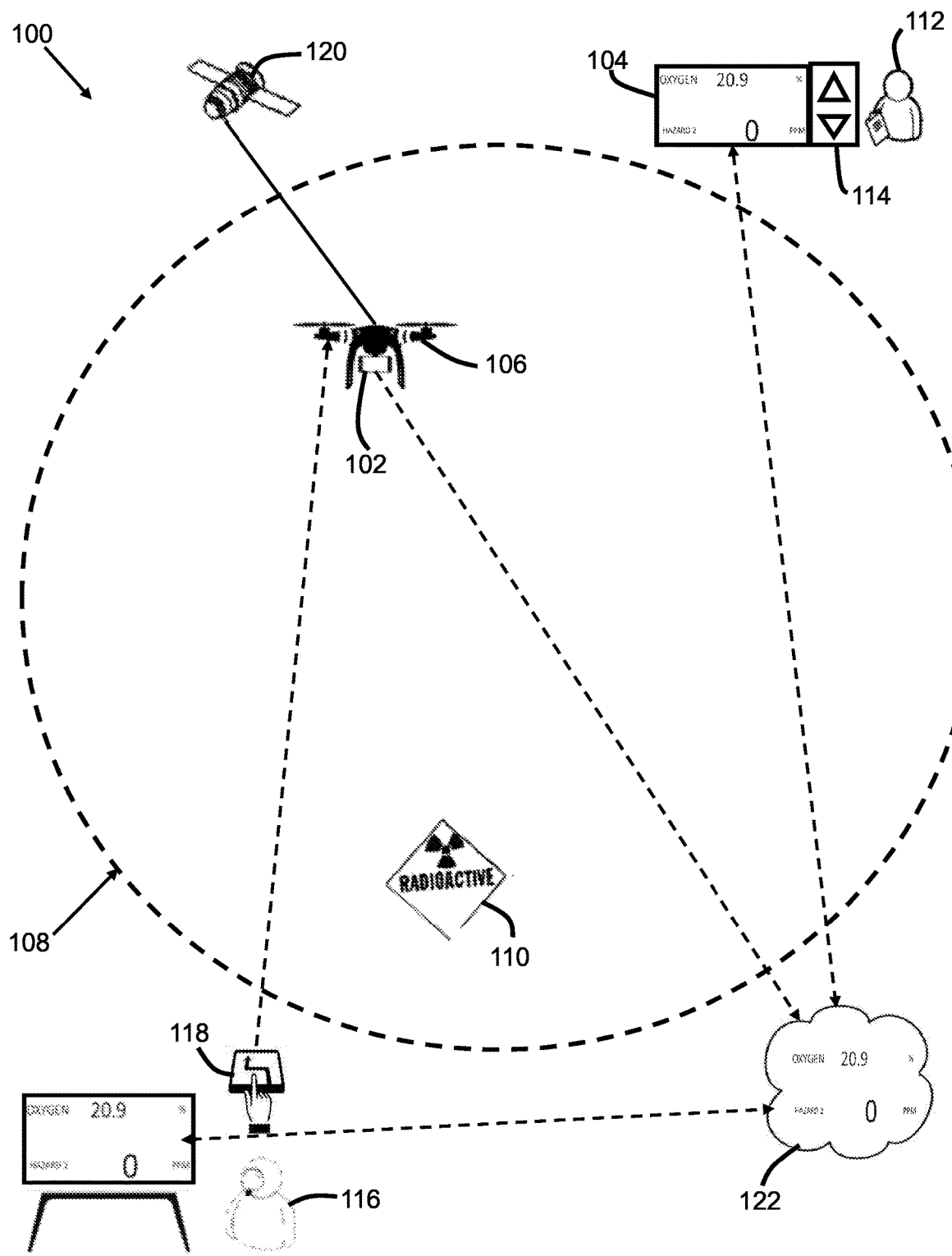
FIG. 1 illustrates a block diagram of an exemplary training simulation system, in accordance with an embodiment of the present invention.

As referenced in block diagram shown in FIG. 1, system 100 provides a hazardous material detection simulator 102 that displays simulated readings 104 to indicate presence thereof. The detection simulator 102 automatically generates the simulated readings 104, based on its relative position to a hazard point 110 in an area 108, and based on preprogrammed hazard points, or GPS 120 selected hazard points. In essence, as the hazardous material is more proximal, the simulated readings 104 produce a value greater than a hazardous threshold reading 902, indicating the presence of hazardous material. Conversely, as the hazardous material is more distal, the simulated readings 104 produce a zero-presence value, or a value less than the hazardous threshold reading 902, which indicates A vehicle 106 integrally contains the hazardous material detection simulator 102. A trainee 116 may control vehicle 106, while also observing simulated readings 104. Once the hazard point 110 is determined, based on simulated readings 104, the trainee 116 can form a decision on the readings and react accordingly. The readings can be adjusted based on the position of the vehicle 106 relative to the hazard point 110 and/or the reaction of the trainee 116 to the hazard point 110. In other embodiments of system 100, the simulated readings 104 are automatically generated and adjusted based on the location of vehicle 106 relative to hazard point 110, and also based on a reaction of a trainee 116 to the hazard point 110.

For this purpose, location of vehicle 106 in the area 108 being navigated is tracked through a global positioning system 100 (GPS 120). However, in other embodiments, a host trainer 112, through a trainer communication device 114, remotely generates and adjusts the simulated readings 104 while tracking its position. Host trainer 112, trainee 116, and hazardous material detection simulator 102 remain in contact, and have access to simulated readings 104 through a network 122.

Continuing with FIG. 1, system 100 provides a hazardous material detection simulator 102. Hazardous material detection simulator 102 is configured to simulate hazardous material readings known in the art of hazardous materials, so as to indicate presence thereof. The detection of simulated readings 104 may be an indication of the presence, intensity, and quantity of a hazardous material at or near a hazard point 110 in an area 108. Hazardous material detection simulator 102 may include a smart phone, a tablet, a laptop, a processor, and a digital display.

These communication devices are all capable of displaying the simulated readings 104, capturing images, being tracked by GPS 120, connecting to the network 122, and communicating with the trainer communication device 114 and trainee communication device 118. Furthermore, hazardous material detection simulator 102 displays, shares, and alerts to one or more simulated readings 104, which are generated and adjusted automatically, or by the host trainer 112. In either case, the position of hazardous material detection simulator 102 relative to hazard point 110 determines the value of simulated readings 104.

Simulated readings 104 may utilize any measurement scale used in industry to indicate a type, intensity, and quantity of hazardous material present in the hazard area 108. Exemplary hazardous material units may include, without limitation, parts per million, parts per billion percentage, percentage volume, sievert, unit rem, and roentgen. In some embodiments, a running log of the simulated readings 104 can be maintained and reset by the host trainer 112 or trainee 116, typically called "Peak" values. In some embodiments, any number of users can connect to a training session, and any number of devices can be used at once. For example, spectators can watch the training session on a large television display. Hazardous material detection simulator 102 also alerts when the hazardous threshold reading 902 is reached. For example, hazardous material detection simulator 102 can beep, illuminate with flashes, vibrate, and transmit a signal to a secondary communication device. The alert is fully customizable to have high and low limits.

As discussed above, hazardous material detection simulator 102 automatically generates the simulated readings 104, based on its relative position to the hazard point 110, and based on preprogrammed hazard points in the area 108. In some embodiments, hazardous material detection simulator 102 comprises an algorithm that approximates distance to the hazard point 110. The algorithm has position data, and is also programmed to know the hazard point 110 in the area 108. The simulated readings 104 are generated and adjusted based on the relational distance between the hazardous material detection simulator 102 relative and the hazard point 110.

In another means through which the system 100 automatically generates and adjusts the simulated readings 104, a GPS 120 tracks the position of hazardous material detection simulator 102 in relation to hazard point 110. The GPS 120 tracking feature is central to system 100, in that simulated readings 104 have a value based on the position of the hazardous material detection simulator 102 relative to the hazard point 110. In yet another embodiment, the algorithm and the GPS 120 work in conjunction to generate the simulated readings 104. Simulated readings 104 can also be adjusted to greater or lesser values based on predetermined GPS point, a map location, and GPS coordinates.

However, in other embodiments, the simulated readings 104 are not automatically generated. Rather, a host trainer 112, through use of a trainer communication device 114, remotely generates and adjusts the simulated readings 104 while tracking its position relative to hazard point 110. System 100 enables host trainer 112 to generate simulated readings 104 through the trainer communication device 114. Host trainer 112 can adjust the simulated readings 104 to simulate different locations, intensities, and quantities of hazardous materials. Simulated readings 104 are generated while hazardous material detection simulator 102 navigates over an area 108. This dynamic combination of real time generation of simulated readings 104, while the hazardous material detection simulator 102 navigates over an area 108, creates the hazard point 110.

Figure 2:
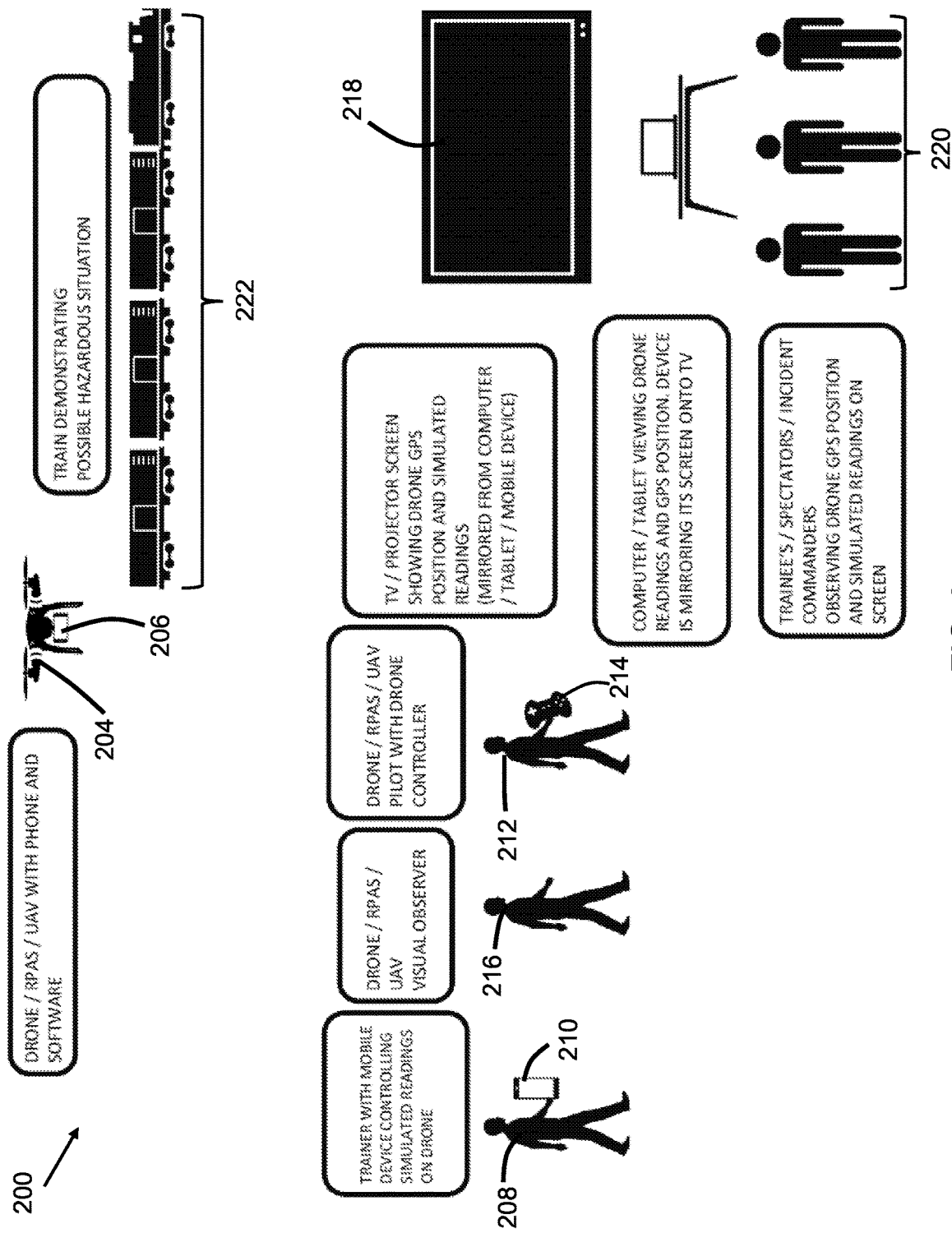
FIG. 2 illustrates a block diagram showing an exemplary training session in which a drone pilot controlling a drone, in accordance with an embodiment of the present invention.

For example, FIG. 2 is a block diagram showing an exemplary training session 200 in which a drone pilot 202 controls a drone 204, which represents vehicle. Drone 204, in this case, has mounted or integrated therein, a hazardous material detection simulator 206, and a Visual Observer (VO). Although drone 204, or other type of vehicle, may carry the hazardous material detection simulator 206, software may be directly integrated into the drone and flight controller and/or ground station. A host trainer 208 utilizes a trainer communication device 210 to control the simulated readings on hazardous material detection simulator 206 attached to the drone 204. The simulated readings are observed by trainee 212 operating a trainee communication device 214 and/or pilot controller device. Further, the system 100 may be directly integrated into the drone, flight controller, and or control/ground station. A spectator 216 may also be present. Whereby, the host trainer, trainee, and spectator access the simulated readings and position of drone 204 through network. Host trainee generates and adjusts simulated readings to indicate a train with a chemical leak, serving as the hazard point 222. Trainee 212 must use simulated readings to identify the train car from which the chemicals leaked.

And as illustrated, simulated readings can also be mirrored onto a TV screen 218 for incident commanders, spectators, or other trainees 220 to observe and form decisions on the data. In one embodiment, GPS tracks the drone in real time on GPS on the trainer communication device 210, and the trainee communication device 214, for the incident commanders, spectators, or other trainees 220. All of the data and graphics from the train, which is collected by drone 204 is visible to all parties through the TV screen 218, or other digital display devices known in the art. All parties connected on the network 122 are in communication via radio, the application, or other methods.

Figure 3:
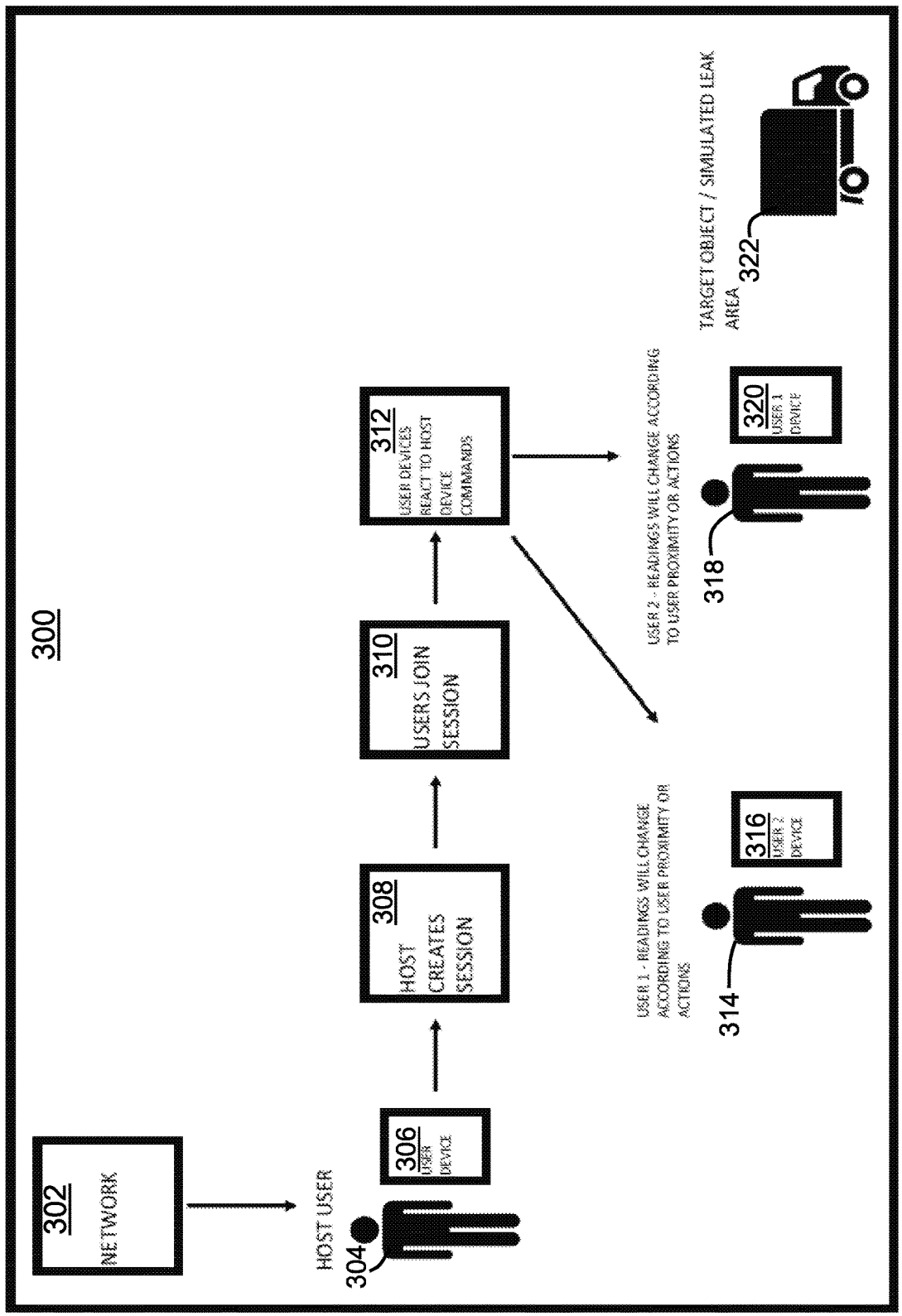
FIG. 3 illustrates a block diagram of an exemplary training session, in which trainer communication device generates a simulated reading for trainee, in response to proximation to trainee to hazard point, in accordance with an embodiment of the present invention.

Looking now at FIG. 3, an exemplary network regulated training session 300 is referenced, showing a network 302 that enables a host trainer 304 and two trainees 314, 318 to communicate with vehicle and hazardous material detection simulator 102. As illustrated, host trainer 302 utilizing a trainer communication device 306 to control the simulated readings, which are viewable on hazardous material detection simulator 102 and a trainee communication device 316, 320. Host trainer 304 initially creates 308 a training session through the trainer communication device 306. Trainees 314, 318 may then join 310 the training session through their own trainee communication devices 316, 320. The trainee communication devices 316, 320, through the network 302 are configured to respond 312 to simulated readings from trainer communication device 306. In this manner, the Trainees 314, 318 can identify the hazard point 322, which in this case is a semi-truck leaking chemical.

Figure 5:
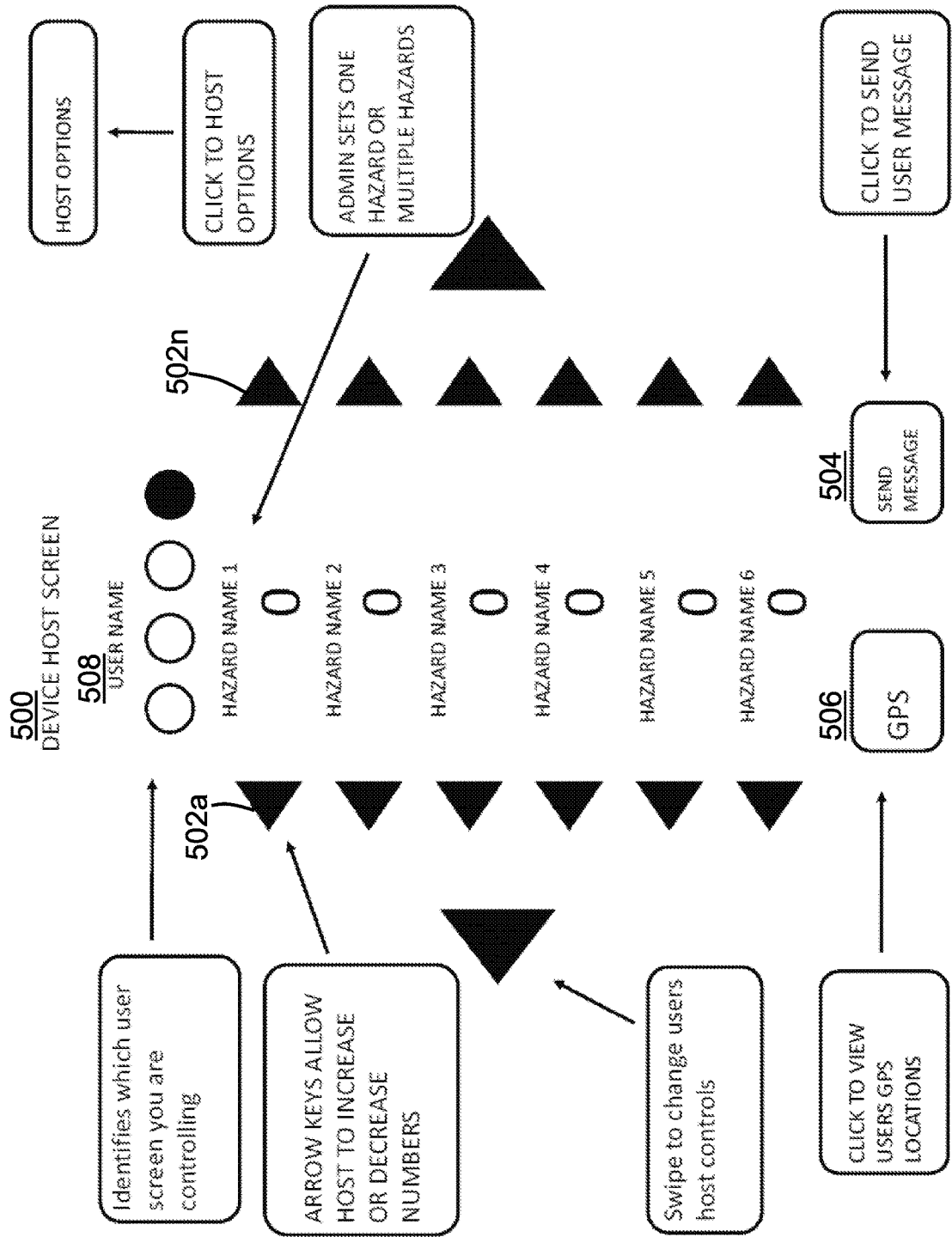
FIG. 5 illustrates the trainer communication device displaying a controller screen that enables host trainer to select which trainee to control individually, in accordance with an embodiment of the present invention.

It is significant to note that the simulated readings commence, either automatically through an algorithm in the hazardous material detection simulator 102, or through the trainer communication device 114, being operated by the host trainer. For example, FIG. 5 illustrates the trainer communication device 114 displaying a controller screen that enables host trainer 112 to select which trainee 116 to control individually. Incremental switches allow simulated readings 104 to be increased or decreased accordingly. Furthermore, trainer communication device 114 can select the type of hazardous material that is simulated through use of different units. For example, a sievert unit is an indication of possible radioactive hazardous material. Additionally, the user interface of trainer communication device 114 can be customized by host trainer 112 to demonstrate any number of individual or simultaneous hazards on trainee communication device 118, discussed below.

Continuing with exemplary trainer communication device 114s, a standalone unit specific to the system 100 can be manufactured to perform functions of trainer communication device 114. However, in other embodiments, a personal smart phone or tablet of the host trainer 112 can download software that enables functions of generating and adjusting simulated readings 104, and monitoring position of hazardous material detection simulator 102. FIG. 3 illustrates a block diagram of an exemplary training session, in which trainer communication device 114 generates a simulated reading for trainee 116, in response to proximity to trainee 116 to hazard point 110. As shown, the trainer communication device 114 enables host trainer 112 to increase or decrease simulated readings 104. As trainee 116 approaches a simulated leak, hazard readings are increased by host trainer 112. As trainee 116 user moves farther, host trainer 112 can manually change simulated readings 104 to reflect the reduced hazard due to distance.

Figure 4:
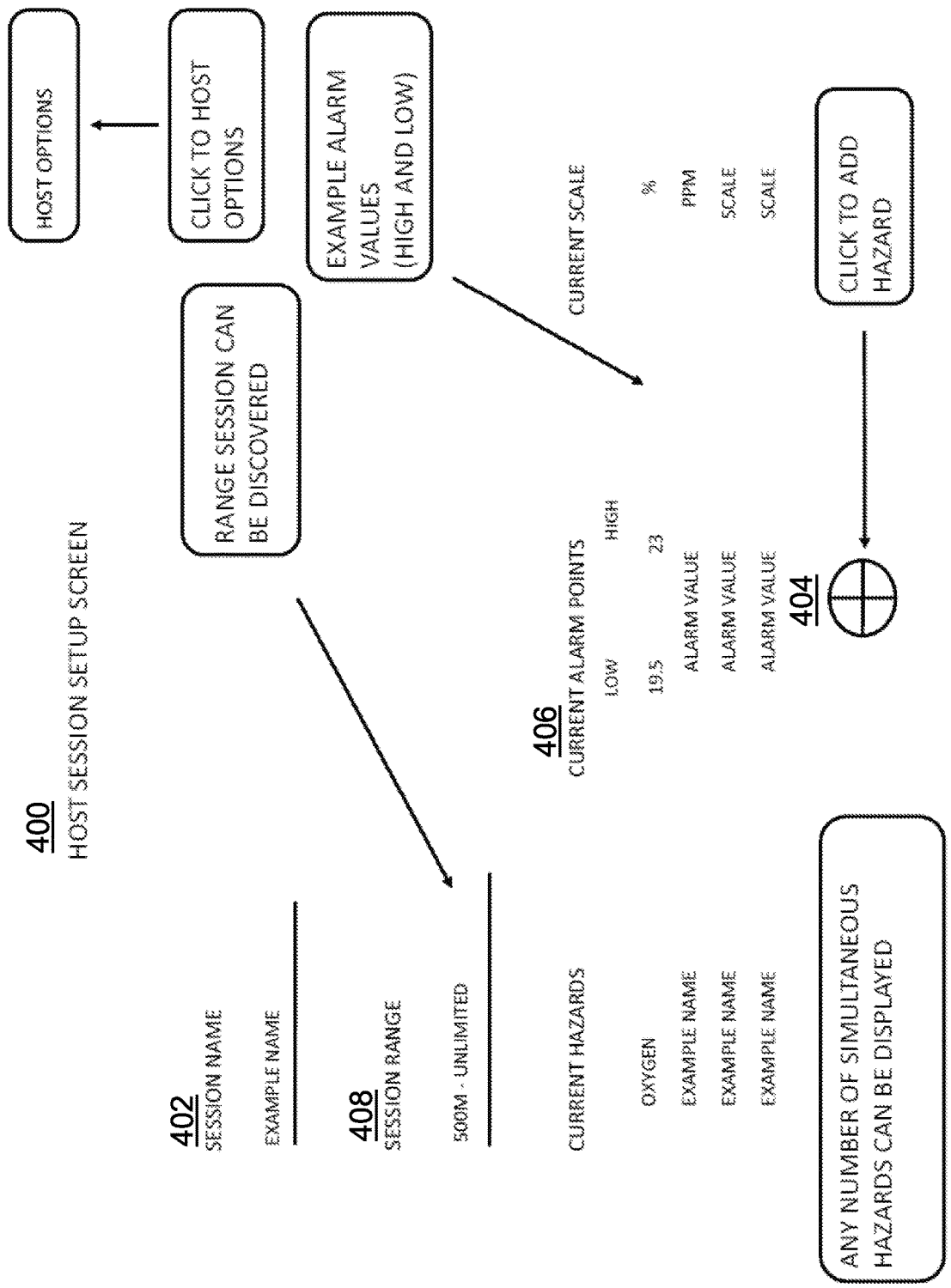
FIG. 4 illustrates an exemplary trainer communication device displaying a setup screen, in accordance with an embodiment of the present invention.

FIG. 4 references an exemplary setup screen 400 displaying on the trainer communication device 114. While operating setup screen 400, host trainer 112 sets up the parameters for the training session, including the training session name 402, and which simulated hazards 404 will appear on the connected trainee communication device 118 screen, as well as their respective alarm points 406. Host trainer 112 can also set a range 408 of which the training session is discoverable. This can be customized to any number or distance, to prevent sessions from being joined or visible from other parties. Additionally, the software may also include a session password to ensure privacy if warranted.

Figure 6:
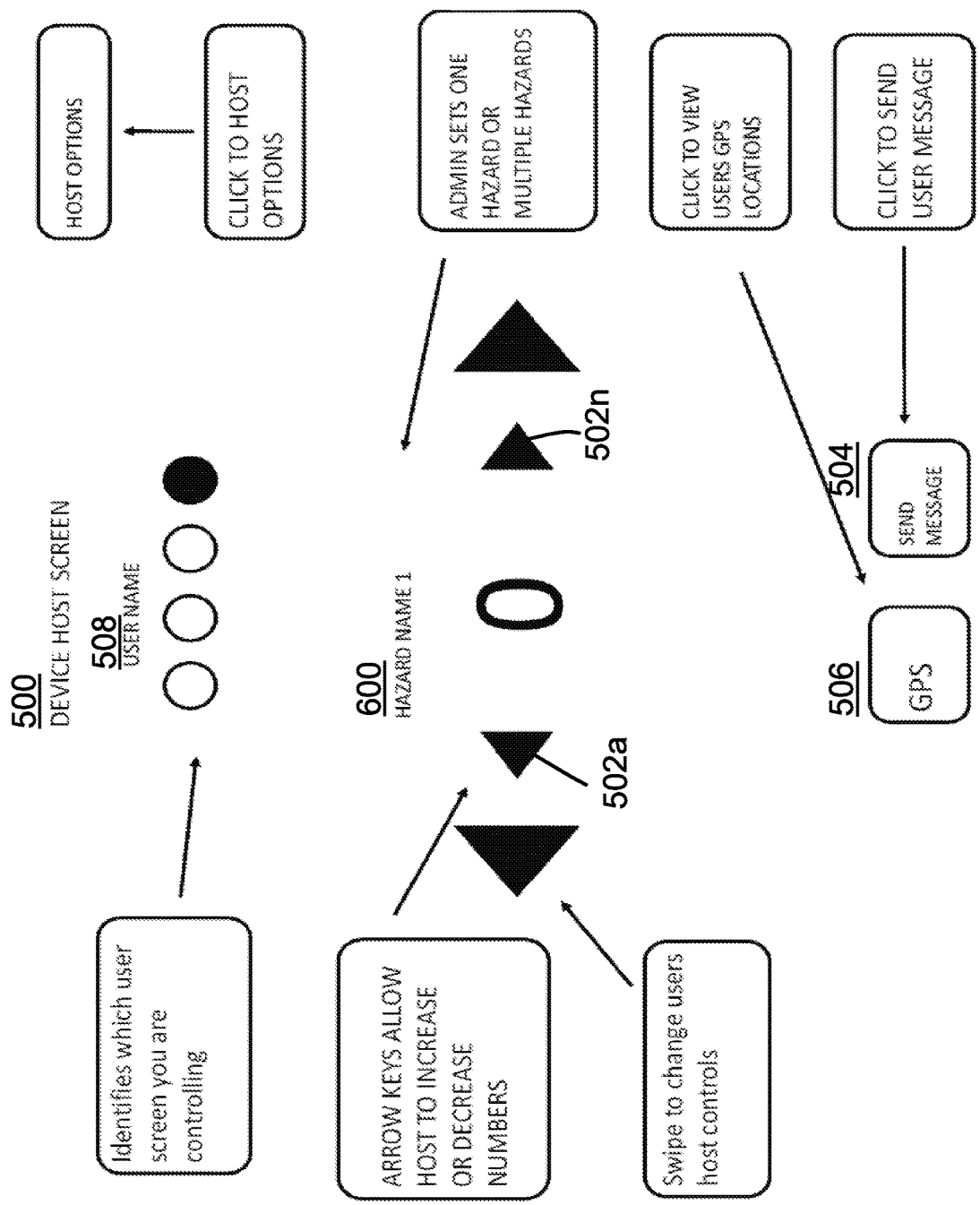
FIG. 6 illustrates the controller screen shown in FIG. 5, but with only one simulated hazardous material, in accordance with an embodiment of the present invention.

FIG. 5 illustrates an exemplary controller screen 500 displaying on the trainer communication device 114. Controller screen 500 enables host trainer 112 to select which simulated readings that are accessible to a specific trainee 116 are generated and/or adjusted. Controller screen 500 also includes multiple incremental switches 502a, 502n that are configured in the shape of arrows, so as to increase and decrease the simulated readings 104. Controller screen also provides a user name 508 to track which trainee is receiving the simulated readings. Furthermore, controller screen also provides at least one button 504 that enables host trainer 112 to send messages to trainee 116 individually, as well as track the trainee 116 in real time through a GPS mapping function 506. FIG. 6 is the same controller screen as in FIG. 5, except only one hazardous material 600 is simulated. However, in other embodiments, multiple hazardous materials can be simultaneously displayed or controlled from controller screen 500.

Figure 7:
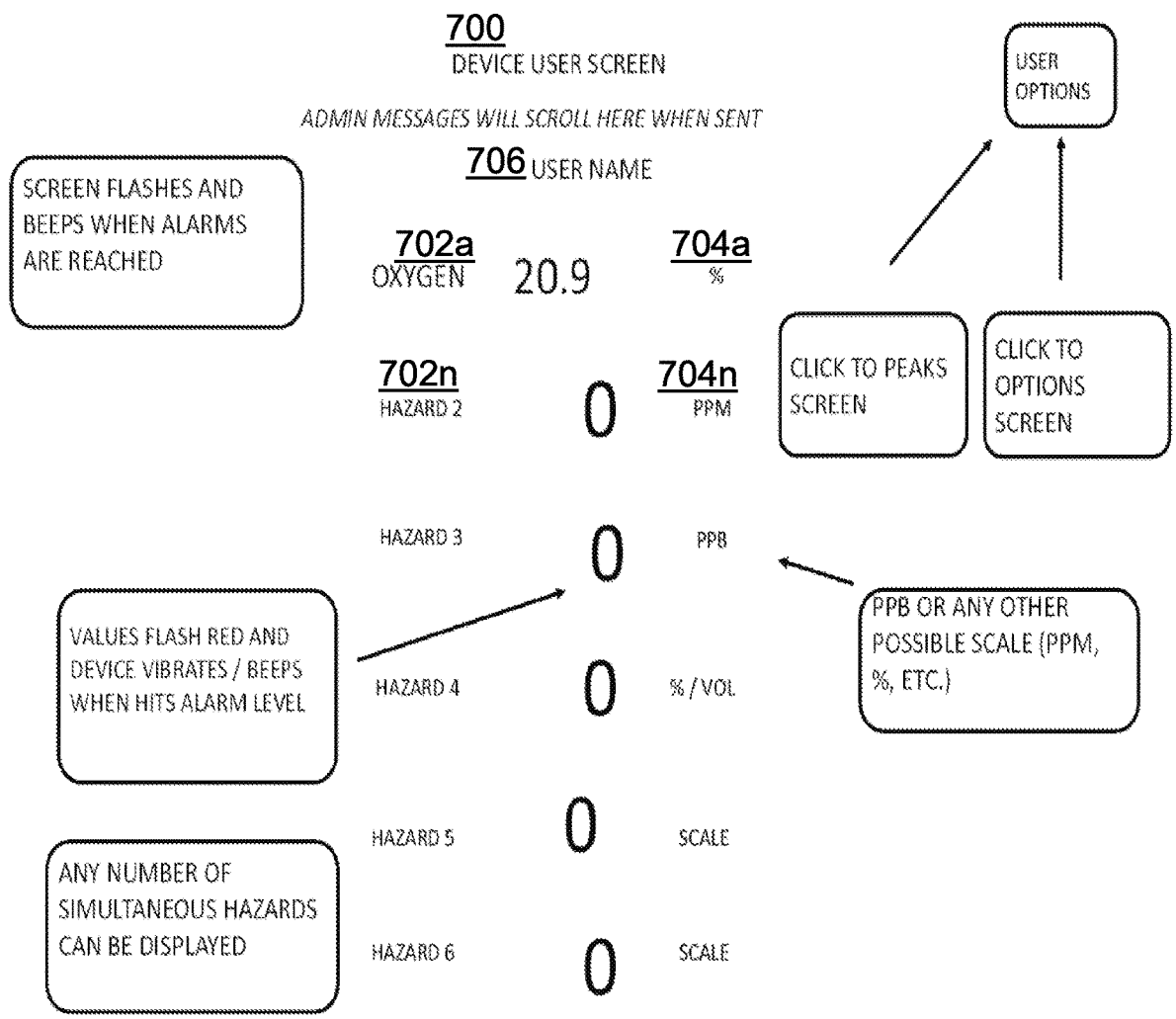
FIG. 7 illustrates an exemplary trainee communication device displaying a trainee screen where simulated readings from trainer communication device are displayed, in accordance with an embodiment of the present invention.

FIG. 7 demonstrates an exemplary trainee screen 700 displaying on trainee communication device 118. Trainee screen 700 provides a display where simulated readings 104 from trainer communication device 114 can be observed, so as to identify hazard point. Simulated readings for multiple hazardous materials 702a, 702n display on trainee screen 700. The units and scales 704a, 704n for the hazardous materials 702a, 702n also display. For example, Oxygen has a unit of percentages. In some embodiments, the units and scales 704a-n for simulated readings 104 flash a different color and beep when alarm values are reached. Additionally, the user name 706 of trainee displays for identification.

Figure 8:
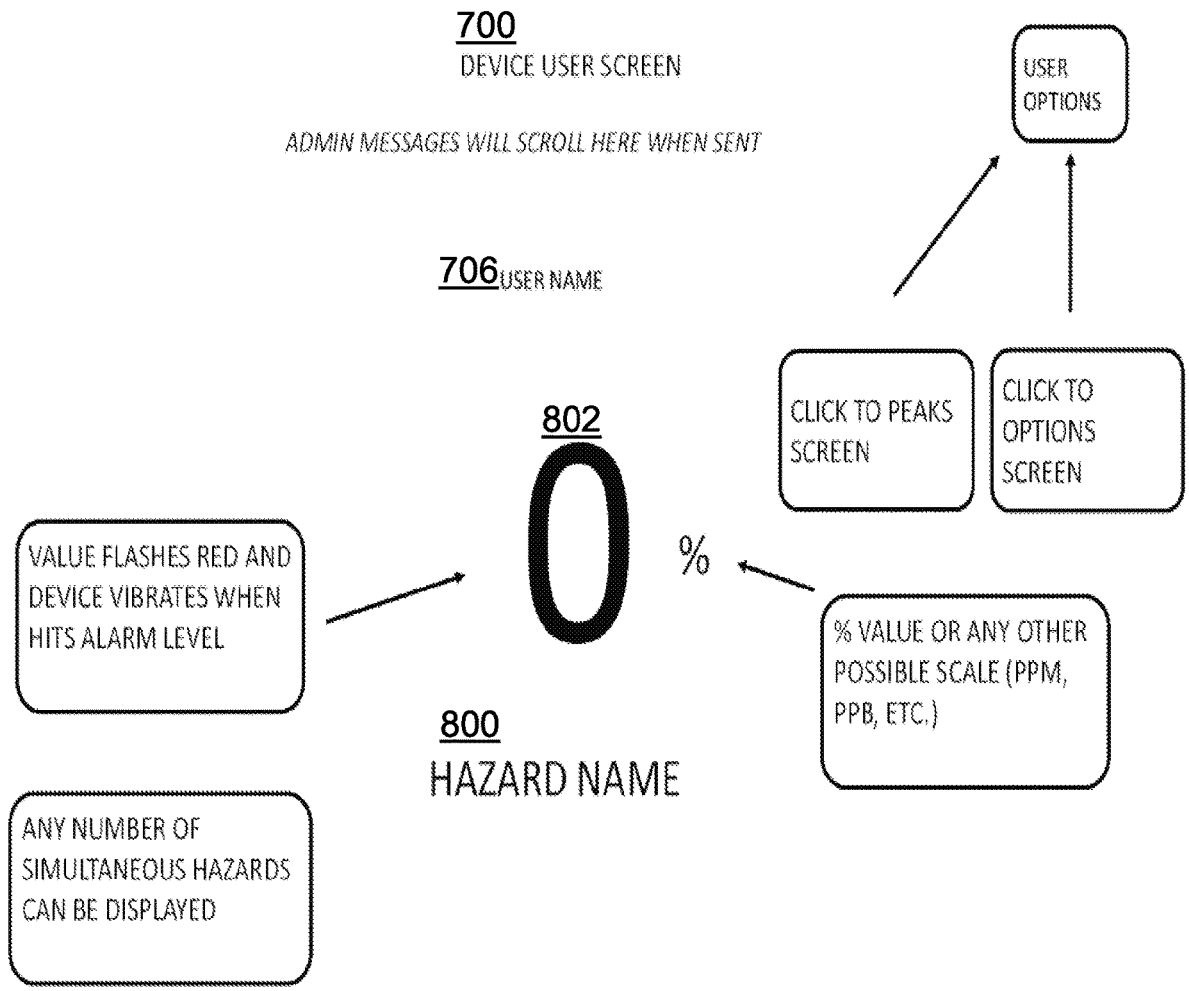
FIG. 8 illustrates the trainee communication device shown in FIG. 7, with fewer hazardous materials selected, in accordance with an embodiment of the present invention.
Figure 9:
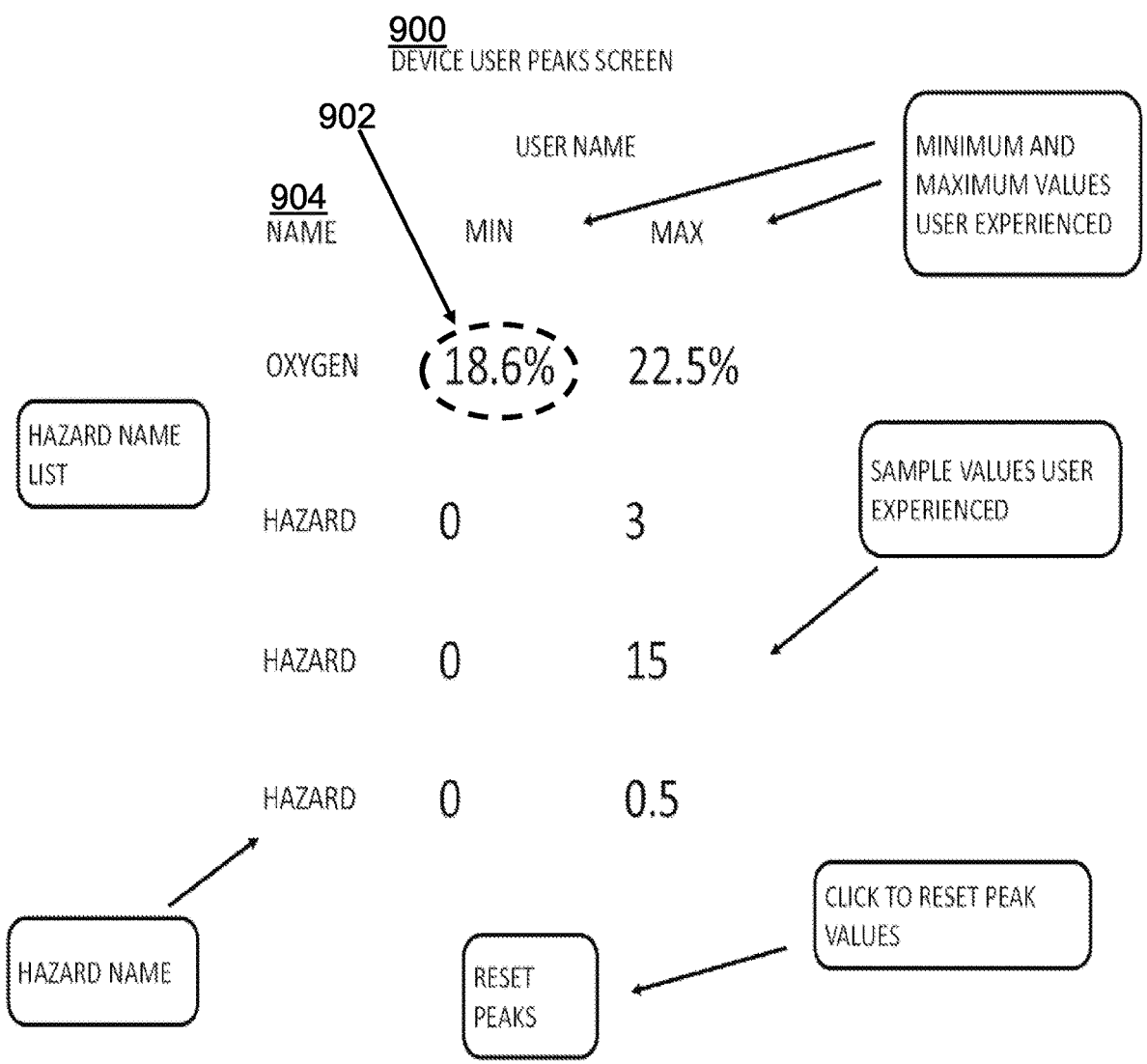
FIG. 9 illustrates an exemplary trainee communication device displaying a peak screen, in accordance with an embodiment of the present invention.

FIG. 8 shows the same trainee screen 700, but with fewer hazardous materials 800, and their respective units and scales 802 displayed on trainee communication device 118, in comparison to FIG. 7. This is the user screen where simulated readings 104 are displayed which come from the trainer communication device 114. The values flash a different color and beep when alarm values are reached. Looking now at FIG. 9, a peak screen 900 for trainer communication device 114 displays. Peak screen 900 keeps a running record of the highest, and lowest simulated readings 104 that trainee 116 experienced throughout the duration of the training session. This record can be cleared by trainee 116 at any time and is a useful training tool. The minimum is known as the threshold reading 902, representing presence of the hazardous material. The name 904 of the hazardous material also displays next to the range.

In some embodiments, system 100 is accessible through a software application that is downloadable by the host trainer 112 to the trainer communication device 114. Through the software application, host trainer 112 can simulate hazards and communicate the simulations to individual user trainee communication device 118s. Host trainer 112 observes the simulated readings 104 on the trainer communication device 114, which is in communication with hazardous material detection simulator 102, through a network 122. Network 122 shares the simulated readings 104, making the readings accessible to the host trainer 112, the trainee 116, and the pilot. In essence, simulated readings 104 are visible to all parties that have access to the network 122.

Figure 10:
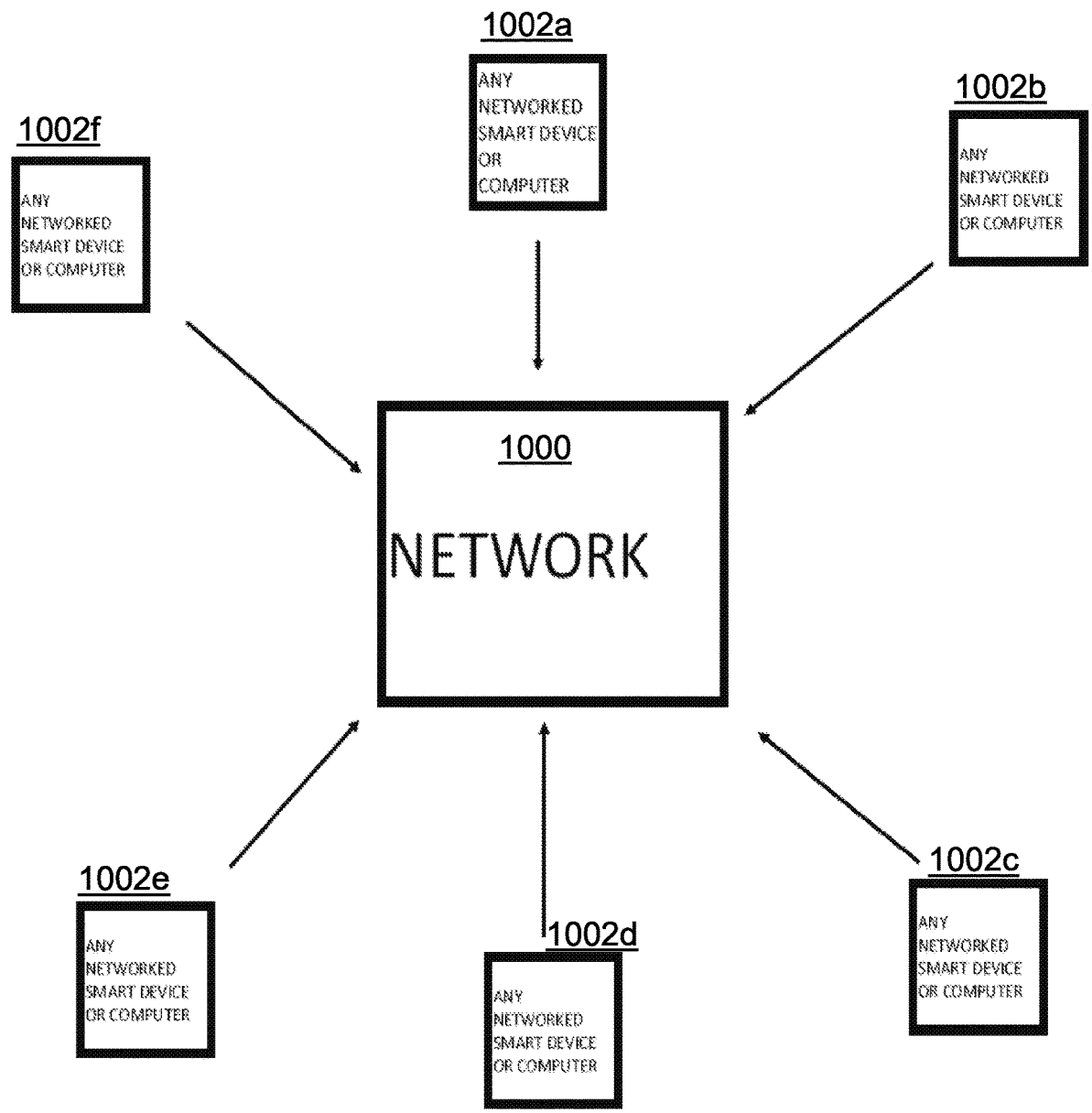
FIG. 10 illustrates an exemplary network in which host trainer and trainee are connected to a wireless network, in accordance with an embodiment of the present invention.

In one embodiment, a network 122 links the trainee communication device 118 with the host trainer communication device 114, which may be a computer, mobile device. Network 122 may include, without limitation, a wireless or cellular data network, LAN, WIFI, Internet, and cloud. Network 122 also shares simulated readings 104 with trainee 116, general spectators, and additional trainees that are watching the position of hazardous material detection simulator 102 and the simulated readings 104 on a display screen. FIG. 10 references an exemplary network 1000 in which host trainer 112 and trainee 116 are connected wirelessly.

This type of network 1000 may be either internet, or "wireless local area network" (WLAN). In one non-limiting embodiment, network 1000 connects to a first smart device or computer 1002*a*, a second smart device or computer 1002*b*, a third smart device or computer 1002*c*, a fourth smart device or computer 1002*d*, a fifth smart device or computer 1002*e*, and a sixth smart device or computer 1002*f*.

Figure 11:
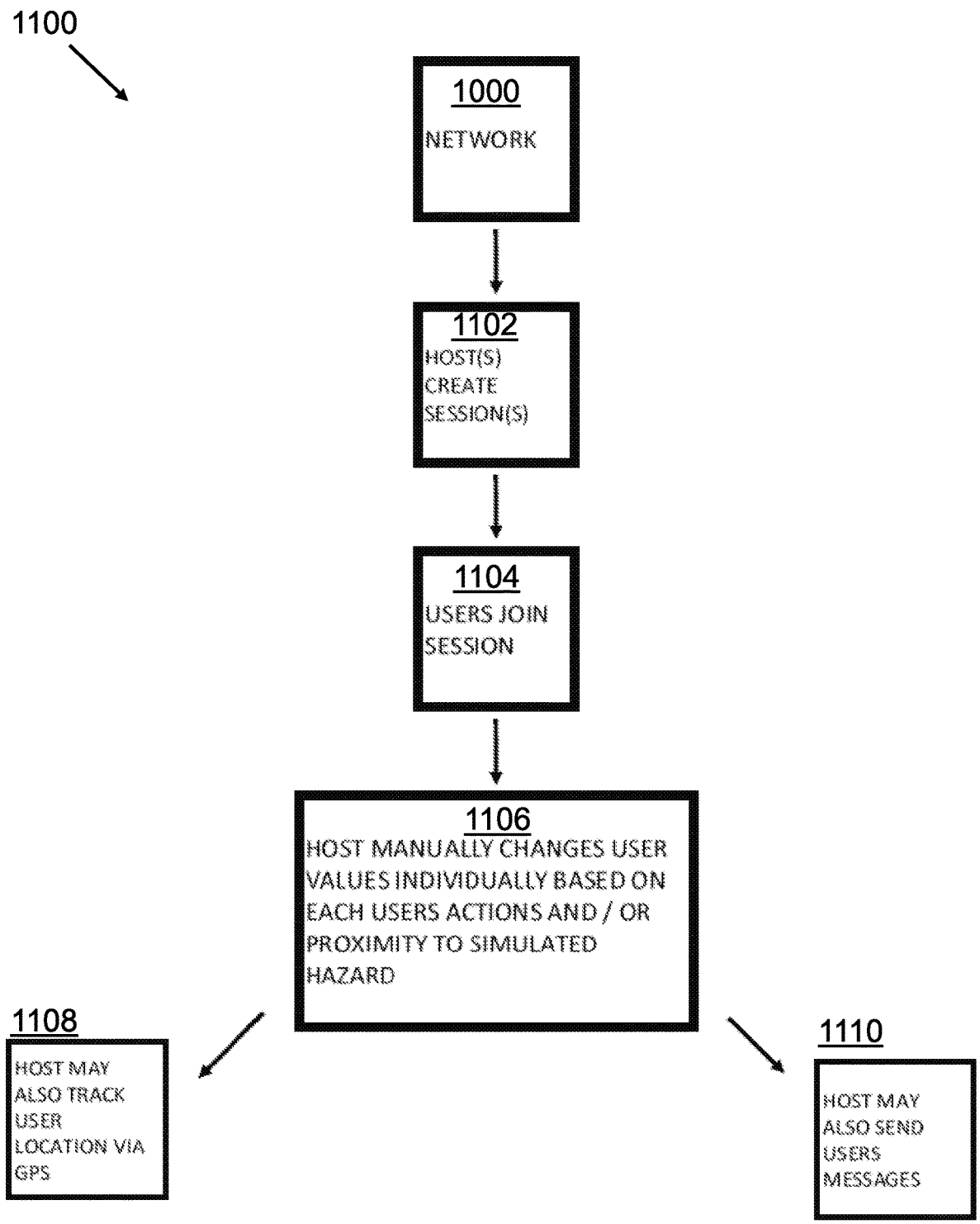
FIG. 11 illustrates a block diagram for a basic software logic used with the network, in accordance with an embodiment of the present invention.

In some embodiments, the installed software in the hazardous material detection simulator 102 relies on user to user commands being transmitted over the network 122. Host trainer and trainee communication devices 112, 118 do not need to be on the same network 122, although a shared local area network configuration is contemplated within the present disclosure. For example, FIG. 11 shows a block diagram for a basic software logic 1100 used with the network 1000. All devices are on network 1000, and the host creates a joinable session that can then send commands (simulated readings, messages, view user location, etc.) to connected user devices. Any number of users can join, and any number of simultaneous hosts and sessions can be simultaneously created. Initially the host trainer creates 1102 a training session on trainer communication device. The trainee may then join 1104 the training session. The host trainer can then generate and adjust 1106 the simulated readings to indicate to trainee the location of hazard point. Host trainer can also track 1108 trainee, and send messages 1110 to trainee. These are the fundamental steps for the training session.

Figure 12:
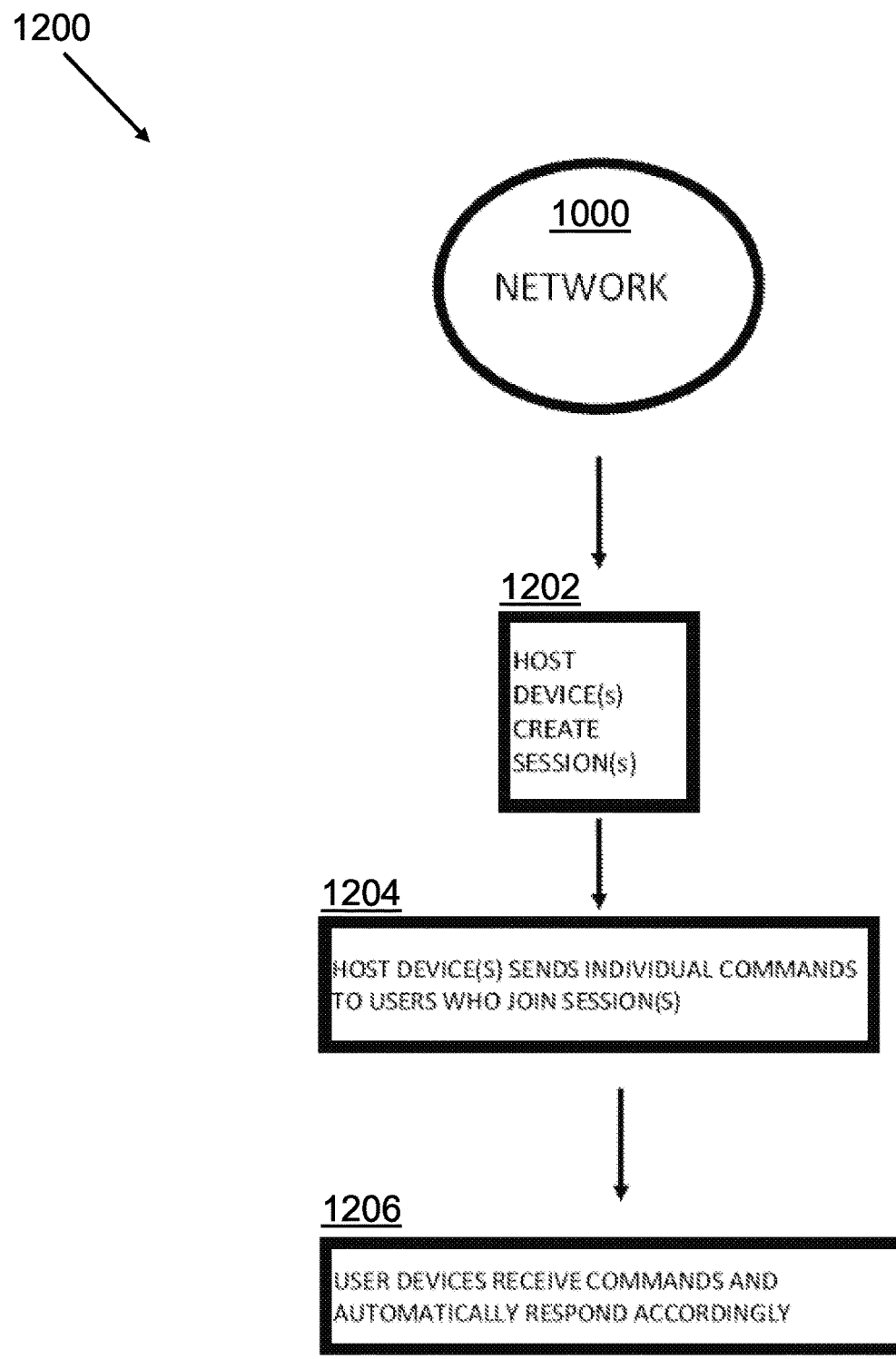
FIG. 12 illustrates a block diagram of multiple trainees connected to a training session with host trainer, in accordance with an embodiment of the present invention.

FIG. 12 illustrates a block diagram of a networked process 1200 of multiple trainees connected to a host trainer 112 during training session. In this unique networked process 1200, the trainee communication device 118 receives commands messages, simulated readings 104. Further, the trainees can be tracked for location purposes via GPS 120, mapping, Google maps, and the like. In one possible embodiment, trainer communication device creates 1202 a training session. Host trainer sends 1204 individual commands, in the form of simulated readings and messages to trainee. Trainee communication device then receives 1206 commands, and automatically responds. For example, initiating search at hazard point, based on threshold hazardous reading 902. At this point, host trainer can generate and adjust the simulated readings to indicate to trainee the location of hazard point.

Figure 13:
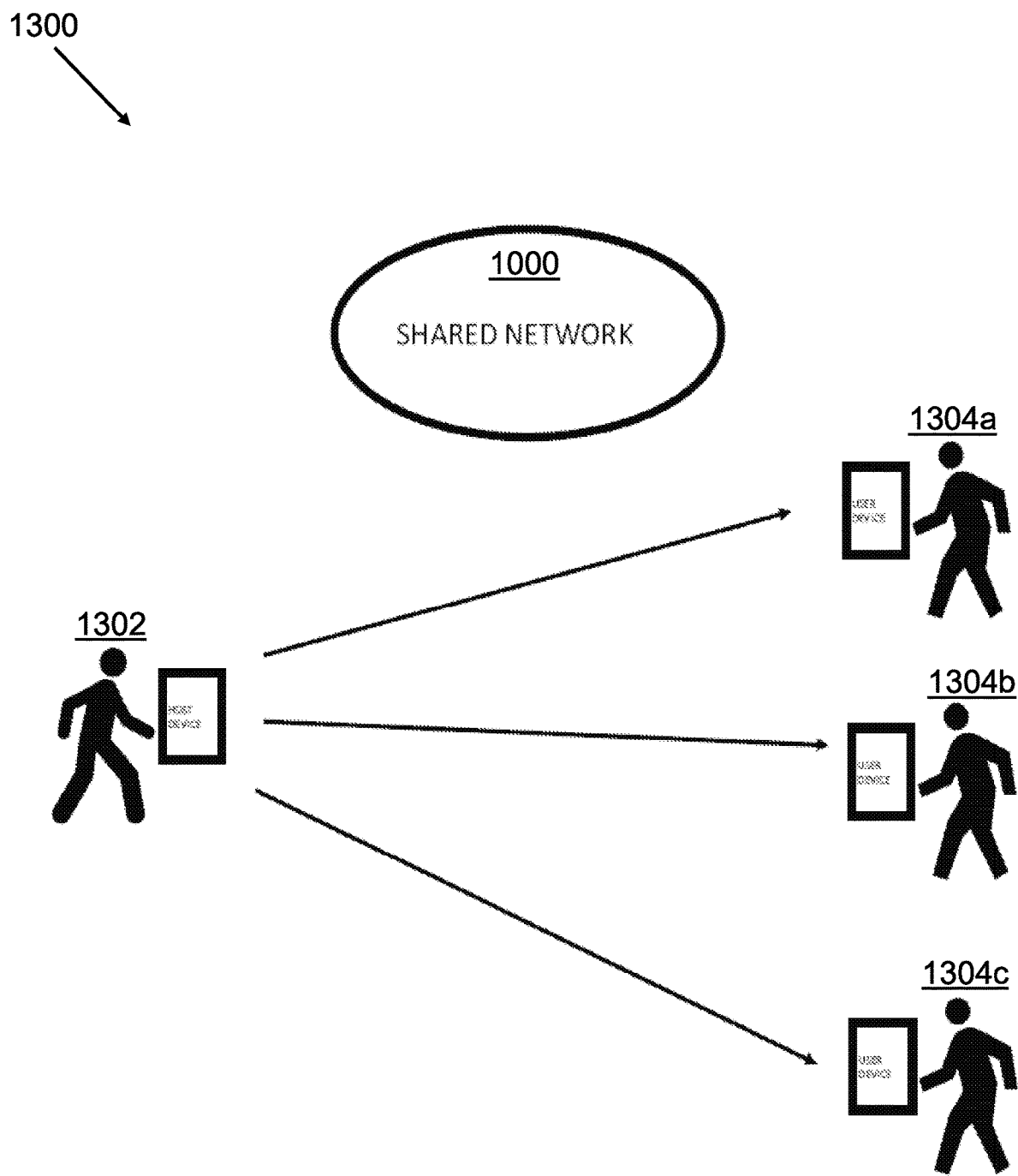
FIG. 13 illustrates a block diagram of host trainer and trainee connected through a network, in accordance with an embodiment of the present invention.

Looking now at FIG. 13, yet another networked system 1300 shows a host trainer 1302 in communication with multiple trainees 1304*a*, 1304*b*, 1304*c* during a training session. All partiers are connected to network 1000, and the trainer communication device 114 of host trainer 1302 sends commands to trainee communication device 118 of trainees 1304*a*-*c*, either simultaneously, or one at a time. The hazardous material detection simulator 102 may also receive the simulated readings and messages, as needed. In another embodiment, software enables trainer communication device 114 to control simulated readings 104 on one or more trainee communication devices, such as laptops, cellphones, and tablets over the network 1000. The software is a "cross platform", meaning it can be used between desktop, iOS, Android, Windows, and similar operating devices. The software does not require any form of transmitter beyond a conventional mobile device functionality. Exemplary transmissions may include radio frequencies, infrared, GPS 120, or similar types of signals known in the art.

As shown in FIG. 14, trainee 116 has a trainee communication device 1400 that enables access to simulated readings 104. Trainee 116 utilizes the trainee communication device 118 to view the simulated readings 104, which are also viewable on hazardous material detection simulator 102 and the trainee communication device 118. Trainee communication device 1400 is configured to display a login screen 1402, where trainee begins training sessions. Initially, trainee views user name 1404, and the name or label of the training session 1406 that is happening in real time. Trainee 116 may login through a Log On button 1408 via social networks, email, username, or similar. From login screen 1402, trainee 116 can also view available training sessions through a session button 1410, and join at any time.

Looking back at FIG. 1, system 100 provides a vehicle 106. Vehicle 106 is the component of the system 100 that navigates an area 108 in search of hazard point 110. In one embodiment, trainee 116 controls vehicle 106. However, in alternative embodiments, a pilot can be used to control vehicle 106, while trainee 116 simply observes and reacts to simulated readings 104. In some embodiments, system 100 enables a trainee 116 to control vehicle 106 while also observing the simulated readings 104 generated on the hazardous material detection simulator 102. Trainee 116 accesses the simulated readings 104 through a trainee communication device 118 that is in communication with the hazardous material detection simulator 102, through a network 122. Trainees may work independently or be comprised of a response team.

Once the hazard point 110 is determined, based on the simulated readings 104, the trainee 116 can react accordingly, form a decision on the readings, receive advice from the host trainer 112, and request assistance form the host trainer 112. An exemplary reaction may include donning a hazardous material suit and removing the object, which has been simulated as real hazardous material, into a proper disposal unit. When this reaction is taken by trainee 116, readings can be adjusted. In this example, the simulated readings 104 are dropped to a value of zero. Based on proximity, the readings increased or decreased. This interactive, real-time observation of simulated readings 104 serves as a unique training regimen. The trainee 116 will then know that the appropriate steps have been taken dispose and remedy the hazardous material situation. The trainee 116 may then continue with the vehicle 106 to another hazard point 110 in the area 108.

Figure 15A:
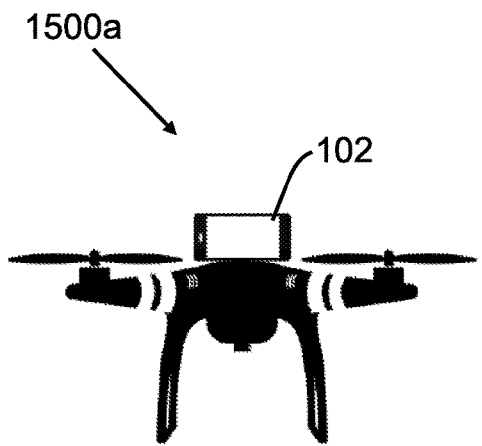
FIGS. 15A-15C illustrate exemplary vehicles, where
Figure 15B:
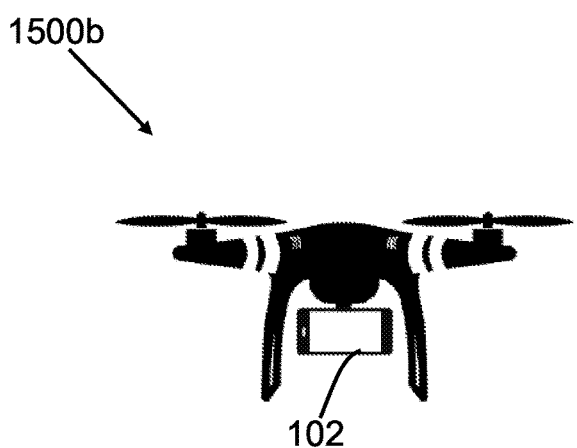
Figure 15C:
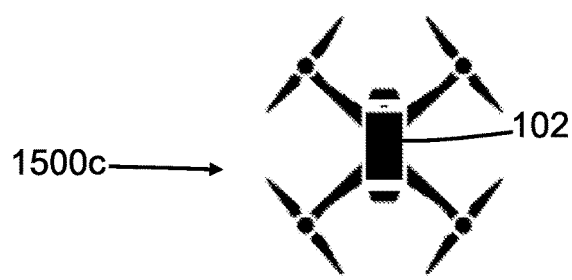

Turning now to FIGS. 15A-15C, the vehicle 106 is an unmanned aerial vehicle or a drone carrying hazardous material detection simulator 102 as a payload. As illustrated, FIG. 15A shows unmanned aerial vehicle 1500*a* carrying hazardous material detection simulator 102 on top surface in an upright position, for capturing images. FIG. 15B shows unmanned aerial vehicle 1500*b* carrying hazardous material detection simulator 102 on bottom surface, for capturing images. FIG. 15C shows unmanned aerial vehicle 1500*c* carrying hazardous material detection simulator 102 on top surface in horizontal orientation. However, hazardous material detection simulator 102 can be internally integrated in vehicle, or mounted through other configurations.

However, the vehicle 106 is not necessarily airborne. In other embodiments, the vehicle 106 may include, without limitation, an underwater vehicle, a submarine, a car, a truck, an off-road vehicle, a dog robot, and a general robot. Vehicle 106 may also be any mechanical machine that can navigate with, or independently of the trainee 116, in search of hazard point 110. In one non-limiting embodiment, unmanned aerial vehicle is a component of an unmanned aircraft system (UAS), which include a UAV, a ground-based controller, and a system of communications between the two. A ground base station (or controller) has software that can be integrated into the ground control station (and/or controller).

Vehicle 106 integrally contains the hazardous material detection simulator 102. In other embodiment, hazardous material detection simulator 102 can be configured with mounts to be connected to vehicles, such as drones, RPAS, UAV, and the like. Hazardous material detection simulator 102 can also be configured with accessories, such as connectors for tubing, to simulate sampling from remote locations including underground or other confined spaces. In some embodiments, vehicle 106 comprises a camera that is configured to capture images of the area 108 during navigation thereof. This allows the position of vehicle 106 relative to hazard point 110 be known. And as discussed above, a GPS 120 may also be used to track position of vehicle 106 relative to hazard point 110. In any case, the location of vehicle 106, and thereby hazardous material detection simulator 102, determines the simulated readings 104. In operation, as the vehicle 106 navigates closer to hazard point 110, the readings increase; and as vehicle 106 navigates away from hazard point 110, the readings decrease.

In one example, software integrates into an unmanned aerial vehicle, i.e., drone. The unmanned aerial vehicle is controlled by trainee 116 and flies across the mountain looking for hazard point 110. As the unmanned aerial vehicle approaches the peak of the mountain, software automatically generates simulated readings 104 that simulate a hazardous material, such as a chemical spill from a train. In this example, a train having multiple cars has spilled chemicals. Only one of the cars has spilled the chemicals, and the simulated readings 104 increase as the drone approaches the car that spilled the chemicals.

In another example, software integrates into a dog robot navigating through a bus terminal. The software generates simulated readings 104 to indicate a hazard point 110 in the locker room of the bus terminal. In one embodiment, vehicle 106 can be tracked in real time on GPS 120 by the host trainer 112, the trainee 116, the pilot, and spectators. The position of vehicle 106 in relation to hazard point 110 is determinative of simulated readings 104. Software may also make the dog robot generate an alarming sound once the trainee 116 has identified and reacted to the hazard point 110.

Vehicle 106, or hazardous material detection simulator 102 integrated therein, utilize the software to transmit images of the area 108 and/or GPS 120 location of vehicle 106 through telemetry. As disclosed here, the term telemetry describes the data sent by vehicle 106 to hazardous material detection simulator 102, trainer communication device 114, and trainee communication device 118. Telemetry also covers data sent to and from the flight or drone (robot) controller, flight/drone/robot control screen, or flight/drone/robot controller or control station. The software can be directly incorporated into the flight or drone/robot screen, flight/drone controller, flight, drone, robot information screen, Flight/Robot controller HUD (heads up display), or UI (User interface). It is significant to note also that robot controller can be used as a vehicle, or generator of simulated readings, that transmits and receives data through telemetry means. Robot controller is in fact directly integrated into the screen and controller. This applies to more than just flying drones and robots.

Figure 16:
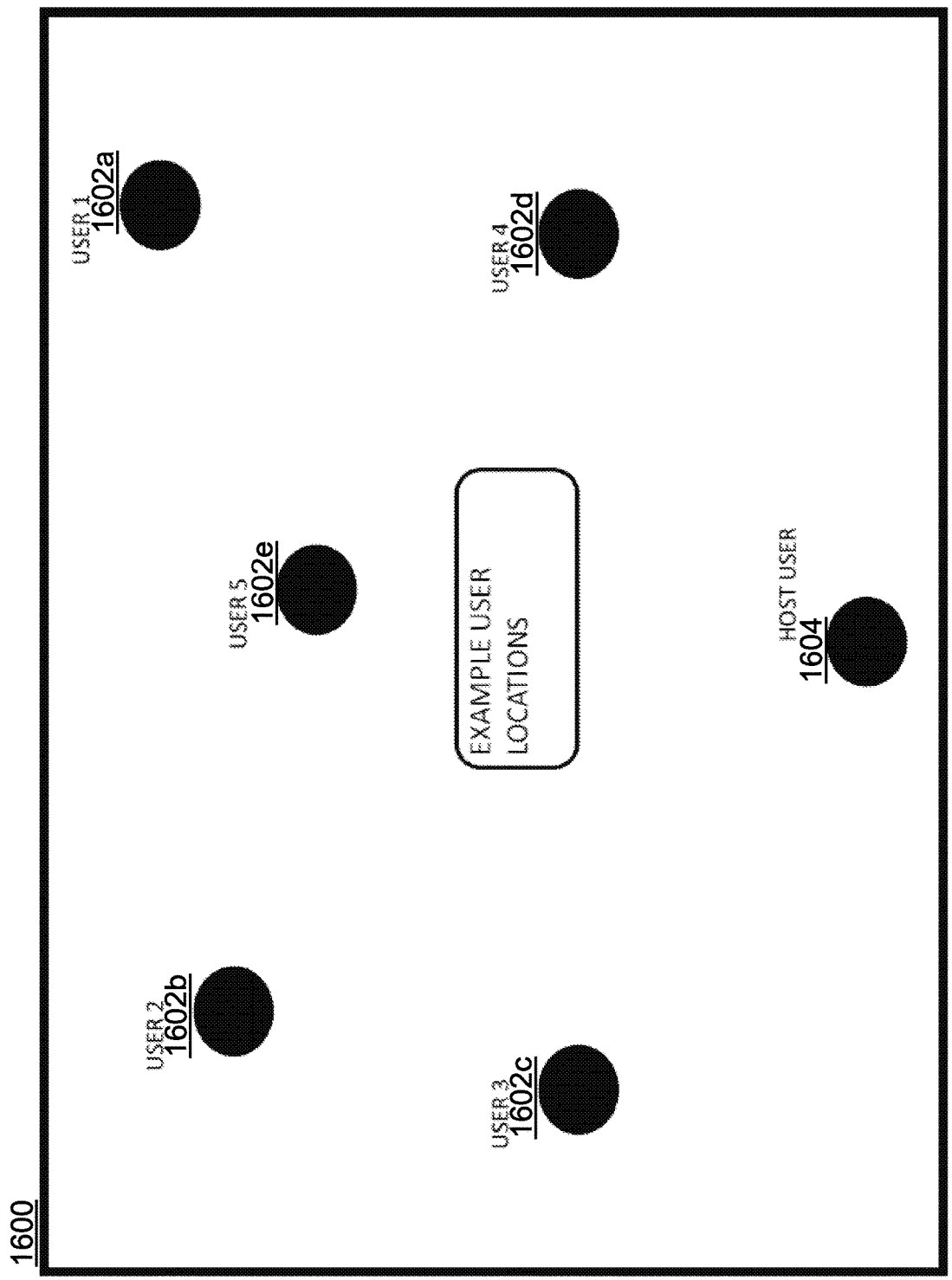
FIG. 16 illustrates an exemplary GPS map, showing locations for multiple trainees, their respective vehicles, and the host trainer being transmitted through telemetry, in accordance with an embodiment of the present invention.

The data may include details such as position, GPS 120, altitude, speed, battery life, warnings, flight time and the like, as well as video, thermal imaging, and audio streams. In this manner, host trainer 112 is aware of the parameters for training session. In other embodiments, the data transmitted from the vehicle 106 can be gathered and transmitted through a telemetry device, such as the hazardous material detection simulator 102, mounted directly on the vehicle 106. Telemetry is configured to transmit data directly to the host trainer 112 and the trainee 116 through telemetry, or other means such as visual camera, thermal feeds, thermal imagers, drone gimbals, and payloads. For example, FIG. 16 illustrates a GPS map 1600, showing locations for multiple trainees 1602a, 1602b, 1602c, 1602d, 1602e arranged inside the area. Trainees 1602a-e may each have their own respective vehicles. Host trainer 1604 transmits the simulated readings, and messages to trainees through telemetry, whereby all parties are connected through network. In some embodiments, GPS map 1600 can be viewed by trainer communication device 114, so as to monitor position of vehicle and/or trainees 1602a-e.

In some embodiments, the software application may also include an audio or visual link between vehicle 106 and trainee 116. Simulated readings 104 are manually sent to the trainee communication device 118 through a host input over a network 122. Trainee 116 and the pilot of the vehicle 106 may be in audio communication through the trainee communication device 118, such that the trainee 116 can direct the pilot on the navigation route of vehicle 106. Trainee 116 would then determine the location of hazard point 110 remotely through the use of vehicle 106. Exemplary data may include simulated readings 104 and images of the area 108 may be mirrored onto a screen for viewing by host trainer 112, trainee 116, incident commanders, spectators, or additional trainees to observe and form decisions on the data.

It is also significant to note that multiple simultaneous training sessions may be created for multiple users. The system 100 of the present disclosure provides for simulation of dangerous situations in which Police, Fire, EMS, Military, Nuclear, Oil and Gas, and other health and safety industries may operate. Additionally, the network 122 and training sessions may be password protected the sessions for privacy concerns.

The present disclosure, in one embodiment, allows for user devices to "spectate" all the simulated readings 104, for instance an incident commander or evaluator. Communication between participants may include direct messaging and other forms of communication, including audio, text, video, and pictures being sent between devices. The screens can be cast, beamed, or mirrored to larger TV or monitors to be viewed in a command post or for a greater remote audience.

Figure 17:
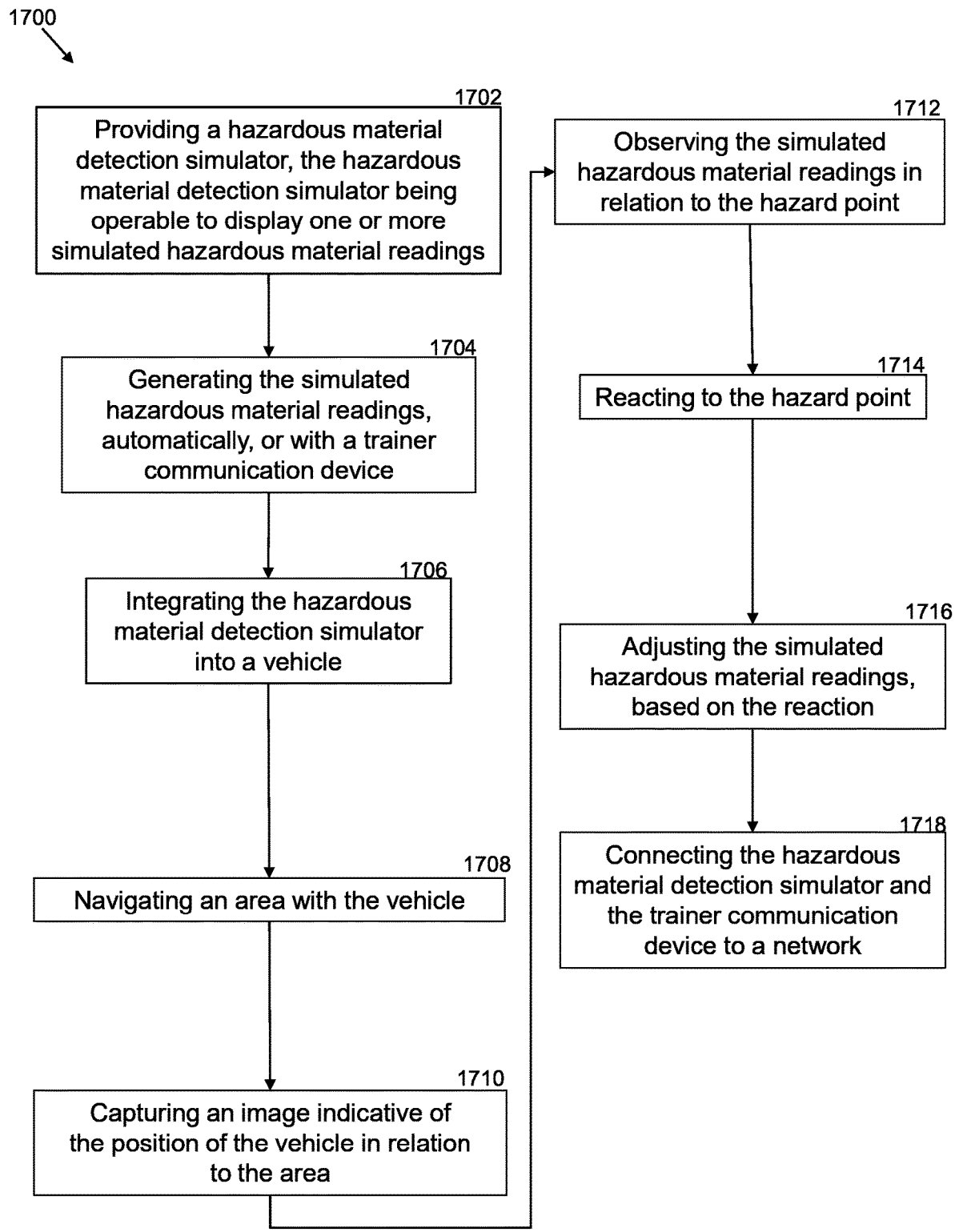
FIG. 17 illustrates a flowchart of an exemplary training simulation method, in accordance with an embodiment of the present invention.

Turning now to flowchart in FIG. 17, a training simulation method 1700 for detection of hazardous materials enable more cost-effective and realistic training, and improves the response to actual hazardous material incidents by first responders. Method 1700 includes an initial Step 1702 of providing a hazardous material detection simulator, the hazardous material detection simulator being operable to display one or more simulated readings. Hazardous material detection simulator may include a smart phone, a tablet, a laptop, a processor, and a digital display. These communication devices are all capable of displaying the simulated readings, capturing images, being tracked by GPS, connecting to the network, and communicating with the trainer communication device and trainee communication device.

Method 1700 may further comprise a Step 1704 of generating the simulated readings. Simulated readings can be generated automatically through an algorithm and/or GPS, which both identify position of the vehicle to generate and adjust the appropriate simulated reading. Method 1700 may further comprise a Step 1706 of integrating the hazardous material detection simulator into a vehicle. Vehicle is the component of the system that navigates an area in search of hazard point. In one embodiment, the vehicle is an unmanned aerial vehicle or a drone. However, in other embodiments, the vehicle may include, without limitation, an underwater vehicle, a submarine, a car, a truck, an off-road vehicle, a dog robot, and a general robot. A Step 1708 includes navigating an area with the vehicle. In some embodiments, trainee controls vehicle, navigating area in search of hazard point In some embodiments, a Step 1710 comprises capturing an image indicative of the position of the vehicle in relation to the area. In some embodiments, a camera can be mounted directly on vehicle, or hazardous material detection simulator can be used to capture the image. The image can include the area, a specific section of the area, the hazard point, and landmarks that help the trainee determine position of the hazard point in relation to vehicle. A Step 1712 includes observing the simulated readings in relation to the hazard point. Simulated readings are an indication of the type of hazardous material, as well as the intensity and quantity of hazardous material. A hazardous threshold reading 902 is a point at which a hazardous material is present. Thus, trainee can determine hazard point when hazard threshold reading 902 is reached.

In some embodiments, a Step 1714 may include reacting to the hazard point. Trainee reacts to resolve hazard point problem. The reaction may include, without limitation, discarding an object that represents a hazardous material, alerting authorities, assisting authorities, remaining at the hazard point, or instructing others to leave the hazard point. Yet another Step 1716 includes adjusting the simulated readings, based on the reaction. The simulated readings can be increased or decreased, either automatically or through the trainer communication device, order to realize the reaction of the trainee.

For example, when the trainee finds and discards the hazardous material at the hazard point, the simulated readings can be reduced below the hazardous threshold reading 902. Or as the trainee and/or vehicle moves closer to the hazard point, the simulated readings can be incrementally increased to simulate that the hazardous material is emitting the chemicals, radiation, smoke, and other signs of a hazardous material. This is possible because trainer communication device comprises at least one switch that is operable to enable incrementally adjusting the simulated readings.

In another embodiment, method 1700 further comprises a Step 1718 of connecting the hazardous material detection simulator and the trainer communication device to a network. Another Step may include sharing the simulated readings on the network. In another embodiment, method 1700 further comprises a Step of automatically generating, with the hazardous material detection simulator, the simulated readings. In another embodiment, method 1700 further comprises a Step of automatically adjusting, with the hazardous material detection simulator, the simulated readings, depending on the reaction and the proximity of the vehicle to the hazard point. Yet another Step includes automatically adjusting, with the hazardous material detection simulator, the simulated readings, depending on the tracked position of the vehicle.

In another embodiment, method 1700 further comprises a Step of generating, by a host trainer, with a trainer communication device, the simulated readings. This allows host trainer to simulate hazards and communicate the simulations to a trainee through a trainee mobile device. In another embodiment, the method 1700 further comprises a Step of adjusting, by the host trainer, with the trainer communication device, the simulated readings, depending on the reaction and the proximity of the vehicle to the hazard point.

In another embodiment, method 1700 further comprises a Step of transmitting, through telemetry, the image indicative of the position of the vehicle to the trainer communication device. In another embodiment, method 1700 further comprises a Step of observing, by a trainee, with a trainee communication device, the simulated readings in relation to the hazard point. In another embodiment, method 1700 further comprises a Step of reacting to the hazard point, by the trainee, to identify the hazard point. In another embodiment, method 1700 further comprises a Step of emitting an alert upon reaching the hazardous threshold reading. In another embodiment, method 1700 further comprises a Step of tracking the position of the vehicle with GPS. This enables tracking the vehicle and the hazardous material detection simulator in real time on GPS on a portable device host/trainer device, as well as for the spectators on a TV, such that the participants can be in communication via radio, the application, or other methods.

In conclusion, training simulation system 100 and method 1700 for detection of hazardous materials simulates real-world hazardous environments to provide a trainee with hazardous material training. The system provides a hazardous material detection simulator that displays simulated readings to indicate presence thereof. The detection simulator automatically generates the simulated readings, based on its relative position to the hazard point, and based on preprogrammed hazard points in the area. In other embodiments, a host trainer, through a trainer communication device, remotely generates and adjusts the simulated readings while tracking vehicle's position. A vehicle integrally contains the hazardous material detection simulator. A trainee controls the vehicle while also observing simulated readings. Once the hazard point is determined, based on simulated readings, the trainee can form a decision on the readings and react accordingly. The readings can be adjusted based on the reaction of the trainee and position of vehicle relative to hazard point.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A training simulation method for detection of hazardous materials, the method comprising:
   providing a hazardous material detection simulator, wherein the hazardous material detection simulator being operable to display one or more simulated readings;

enabling, via the hazardous material detection simulator, a session host interface, a session join interface, and a session spectate interface as a first Graphical User Interface (GUI), wherein
  a first input on the session host interface enables a host trainer to host a session,
  a second input on the session join interface enables one or more trainees to join the session, and
  a third input on the session spectate interface enables one or more spectators to watch the session,
  the one or more spectators are different from each of the host trainer and the one or more trainees;
setting, by the host trainer, a specific range of the session, wherein the specific range includes a wide range network and an internet network;
generating, to one of the host trainer or the one or more trainees, the one or more simulated readings;
integrating the hazardous material detection simulator into a vehicle, wherein the vehicle incudes at least one of an unmanned aerial vehicle or a drone;
navigating, by the one or more trainees, the vehicle within an area;
capturing an image indicative of a position of the vehicle in relation to the area;
displaying one or more incremental switches, one or more identification buttons, a host control change button, and a specific button as a second GUI, wherein
  the one or more incremental switches are in a shape of arrows,
  the one or more incremental switches are operable to enable incrementally adjusting the one or more simulated readings,
  the specific button is operable to enable the host trainer to send one or more messages to the one or more trainees,
  the one or more identification buttons are operable to enable identification of one or more screens of the one or more trainees,
  the host control change button is operable to enable change the host trainer to a new host trainer, and
  each of the one or more incremental switches, the one or more identification buttons, the host control change button, and the specific button is different from each other;
adjusting, by one of the host trainer or the one or more trainees, the one or more simulated readings based on the position of the vehicle in relation to the area, whereby a presence of the one or more simulated readings beyond a hazardous threshold reading within the area, indicates a hazard point;
observing, by one of the host trainer or the one or more trainees, the one or more simulated readings in relation to the hazard point;
reacting, by one of the host trainer or the one or more trainees, to the hazard point;
adjusting, by one of the host trainer, the one or more simulated readings, based on the reaction; and
indicating, by a specific identification button of the one or more identification buttons, to the host trainer, a display screen of a specific trainee of the one or more trainees which is controlled by the host trainer, wherein the specific identification button indicates the display screen of the specific trainee which is controlled by the trainer by a different color than the one or more identification buttons.

2. The method of claim 1, further comprising, automatically generating, with the hazardous material detection simulator, the one or more simulated readings.

3. The method of claim 2, further comprising, automatically adjusting, with the hazardous material detection simulator, the one or more simulated readings, depending on the reaction and the proximity of the vehicle to the hazard point.

4. The method of claim 1, further comprising, adjusting, by the host trainer, with a trainer communication device, the one or more simulated readings, depending on the reaction and the proximity of the vehicle to the hazard point.

5. The method of claim 4, further comprising transmitting, through telemetry, the image indicative of the position of the vehicle to the trainer communication device.

6. The method of claim 4, further comprising connecting the hazardous material detection simulator and the trainer communication device to the internet network.

7. The method of claim 6, further comprising, sharing the one or more simulated readings on the internet network.

8. The method of claim 1, further comprising, observing, by a trainee of the one or more trainees, with a trainee communication device, the one or more simulated readings in relation to the hazard point.

9. The method of claim 8, further comprising, reacting, by the trainee of the one or more trainees, to the hazard point.

10. The method of claim 1, further comprising, observing, by the trainee of the one or more trainees, the one or more simulated readings in relation to the hazard point.

11. The method of claim 1, further comprising, tracking the position of the vehicle with a global positioning system.

12. The method of claim 11, further comprising, automatically adjusting, with the hazardous material detection simulator, the one or more simulated readings, depending on the tracked position of the vehicle.

13. The method of claim 1, wherein the hazardous material detection simulator includes at least one of: a smart phone, a tablet, a laptop, a digital display, a processor, and an algorithm.

14. The method of claim 1, wherein the vehicle further includes at least one of: an underwater vehicle, a submarine, a car, a truck, a dog-bot, and a robot.

15. The method of claim 1, wherein a unit of the one or more simulated readings include at least one: parts per million, parts per billion percentage, percentage volume, sievert, unit rem, and roentgen.

16. The method of claim 1, further comprising, emitting an alert upon reaching the hazardous threshold reading.

17. A training simulation method for detection of hazardous materials, the method comprising:
  providing a hazardous material detection simulator, wherein the hazardous material detection simulator being operable to display one or more simulated readings;
  enabling, via the hazardous material detection simulator, a session host interface, a session join interface, and a session spectate interface as a first Graphical User Interface (GUI), wherein
    a first input on the session host interface enables a host trainer to host a session,
    a second input on the session join interface enables one or more trainees to join the session, and
    a third input on the session spectate interface enables one or more spectators to watch the session,
    the one or more spectators are different from each of the host trainer and the one or more trainees;

setting, by the host trainer, a specific range of the session, wherein the specific range includes a wide range network and an internet network;
automatically generating, to one of the host trainer or the one or more trainees, with the hazardous material detection simulator, the one or more simulated readings;
generating, by the host trainer, with a trainer communication device, the one or more simulated readings;
sharing the one or more simulated readings with the trainer communication device, on a internet network;
integrating the hazardous material detection simulator into a vehicle, wherein the vehicle incudes at least one of an unmanned aerial vehicle or a drone;
navigating, by the one or more trainees, the vehicle within an area;
tracking a position of the vehicle with a global positioning system;
capturing an image indicative of the position of the vehicle in relation to the area;
displaying one or more incremental switches, one or more identification buttons, a host control change button, and a specific button as a second GUI, wherein
    the one or more incremental switches are in a shape of arrows,
    the one or more incremental switches are operable to enable incrementally adjusting the one or more simulated readings,
    the specific button is operable to enable the host trainer to send one or more messages to the one or more trainees,
    the one or more identification buttons are operable to enable identification of one or more screens of the one or more trainees,
    the host control change button is operable to enable change the host trainer to a new host trainer, and
    each of the one or more incremental switches, the one or more identification buttons, the host control change button, and the specific button is different from each other;
automatically adjusting, by one of the host trainer or the one or more trainees, with the hazardous material detection simulator, the one or more simulated readings, depending on the proximity of the vehicle in relation to the area, whereby the presence of the one or more simulated readings beyond a hazardous threshold reading within the area, indicates a hazard point;
emitting an alert upon reaching the hazardous threshold reading;
observing, by one of the host trainer or the one or more trainees, the one or more simulated readings in relation to the hazard point;
reacting, by one of the host trainer or the one or more trainees, to the hazard point;
automatically adjusting, by one of the host trainer or the one or more trainees, with the hazardous material detection simulator, the one or more simulated readings, depending on the reaction and the proximity of the vehicle to the hazard point; and
indicating, by a specific identification button of the one or more identification buttons, to the host trainer, a display screen of a specific trainee of the one or more trainees which is controlled by the host trainer, wherein the specific identification button indicates the display screen of the specific trainee which is controlled by the trainer by a different color than the one or more identification buttons.

18. A training simulation system for detection of hazardous materials, the system comprising:
    a trainer communication device operable to generate one or more simulated readings;
    a hazardous material detection simulator being operable to display the one or more simulated readings;
    enable, via the hazardous material detection simulator, a session host interface, a session join interface, and a session spectate interface as a first Graphical User Interface (GUI), wherein
        a first input on the session host interface enables a host trainer to host a session,
        a second input on the session join interface enables one or more trainees to join the session, and
        a third input on the session spectate interface enables one or more spectators to watch the session,
        the one or more spectators are different from each of the host trainer and the one or more trainees;
    set, by the host trainer, via the hazardous material detection simulator, a specific range of the session, wherein the specific range includes a wide range network and an internet network;
    a trainee communication device of a trainee of the one or more trainees operable to view the one or more simulated readings;
    the internet network operable to share the one or more simulated readings with the trainer communication device of the host trainer, the hazardous material detection simulator, and the trainee communication device of the trainee of the one or more trainees;
    a vehicle integrally containing the hazardous material detection simulator, the vehicle operable to be navigated in an area by the trainee of the one or more trainees, the vehicle including at least one of an unmanned aerial vehicle or a drone;
    a global positioning system tracking a position of the vehicle relative to a hazard point, whereby a presence of the one or more simulated readings beyond a hazardous threshold reading within the area indicates the hazard point;
    display, trainer communication device of the host trainer or the trainee communication device of a trainee of the one or more trainees, one or more incremental switches, one or more identification buttons, a host control change button, and a specific button as a second GUI, wherein
        the one or more incremental switches are in a shape of arrows,
        the one or more incremental switches are operable to enable incrementally adjusting the one or more simulated readings,
        the specific button is operable to enable the host trainer to send one or more messages to the one or more trainees,
        the one or more identification buttons are operable to enable identification of one or more screens of the one or more trainees,
        the host control change button is operable to enable change the host trainer to a new host trainer, and
        each of the one or more incremental switches, the one or more identification buttons, the host control change button, and the specific button is different from each other;
    whereby the trainer communication device adjusts the one or more simulated readings, depending on the proximity of the vehicle in relation to the hazard point, and a reaction to the hazard point by the trainee; and indicate, by a specific identification button of the one or more identification buttons, to the host trainer, a display screen of a specific trainee of the one or more trainees which is controlled by the host trainer, wherein the specific identification button indicates the display screen of the specific trainee which is controlled by the trainer by a different color than the one or more identification buttons.

19. The system of claim 18, wherein the hazardous material detection simulator includes at least one of: a smart phone, a tablet, a laptop, a digital display, a processor, and an algorithm.

* * * * *